US012562789B2

(12) United States Patent
Bavand et al.

(10) Patent No.: US 12,562,789 B2
(45) Date of Patent: Feb. 24, 2026

(54) SYSTEM AND METHODS FOR CONFIGURABLE EIRP RESTRICTION

(71) Applicant: Telefonaktiebolaget LM Ericsson (publ), Stockholm (SE)

(72) Inventors: Majid Bavand, Ottawa (CA); Israfil Bahceci, Kanata (CA); Haomin Li, Kanata (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 351 days.

(21) Appl. No.: 18/027,652

(22) PCT Filed: Sep. 23, 2020

(86) PCT No.: PCT/IB2020/058899
§ 371 (c)(1),
(2) Date: Mar. 22, 2023

(87) PCT Pub. No.: WO2022/064250
PCT Pub. Date: Mar. 31, 2022

(65) Prior Publication Data
US 2023/0379021 A1      Nov. 23, 2023

(51) Int. Cl.
*H04B 7/0456* (2017.01)
*H04B 7/06* (2006.01)
*H04W 52/36* (2009.01)
*H04W 52/42* (2009.01)

(52) U.S. Cl.
CPC ......... *H04B 7/0465* (2013.01); *H04B 7/0617* (2013.01); *H04W 52/367* (2013.01); *H04W 52/42* (2013.01)

(58) Field of Classification Search
CPC . H04B 7/0465; H04B 7/0617; H04W 52/367; H04W 52/42
USPC .......................................................... 455/522
See application file for complete search history.

(56) References Cited

U.S. PATENT DOCUMENTS 7,385,914 B2 * 6/2008 Choi ................... H04L 27/2626
375/267
2018/0183509 A1 * 6/2018 Luo .......................... H04B 7/01
2019/0230591 A1 * 7/2019 Gan ................. H04W 52/0229
(Continued)

FOREIGN PATENT DOCUMENTS

WO      2017068356 A2      4/2017
WO      2020032856 A1      2/2020
WO      2020073191 A1      4/2020

OTHER PUBLICATIONS

International Search Report and Written Opinion of the International Searching Authority, PCT/IB2021/058680, mailed Feb. 8, 2022, 17 pages.
(Continued)

*Primary Examiner* — Don N Vo
(74) *Attorney, Agent, or Firm* — Sage Patent Group

(57) ABSTRACT

A method of operating a radio network node in a wireless communication system includes adaptively limiting effective isotropically radiated power, EIRP, of downlink signals transmitted by the radio network node on different physical channels. Radio network nodes that adaptively limit EIRP of downlink signals transmitted by the radio network node on different physical channels are also described.

24 Claims, 15 Drawing Sheets

Adaptively limiting effective isotropically radiated power, EIRP, of downlink signals transmitted on different physical channels

502

(56)                    References Cited

U.S. PATENT DOCUMENTS

2019/0334605  A1    10/2019  Strong
2020/0028558  A1     1/2020  Yerramalli et al.

OTHER PUBLICATIONS

International Search Report and Written Opinion of the International Searching Authority, PCT/IB2020/058899, mailed May 27, 2021, 9 pages.
Huawei, "Beams and AAS-ETAC", 3GPP TSG-RAN WG4 Meeting #75 AAS AH, R4-75AH-AAS-0061, Venice, Italy, Jun. 29-Jul. 1, 2015, pp. 1-4.

* cited by examiner

100

101

(M-1, 0)   (M-1, 1)   (M-1, N-1)

(1, 0)   (1, 1)   (1, N-1)

(0, 0)   (0, 1)   (0, N-1)

UE 120

UE 120

UE 120

115

115

115

110

110

140

150

Adaptively limiting effective isotropically radiated power, EIRP, of downlink signals transmitted on different physical channels
502

Estimating the transmission gain associated with a first channel
602

Calculating an EIRP limit for the first downlink channel based on the estimated transmission gain
604

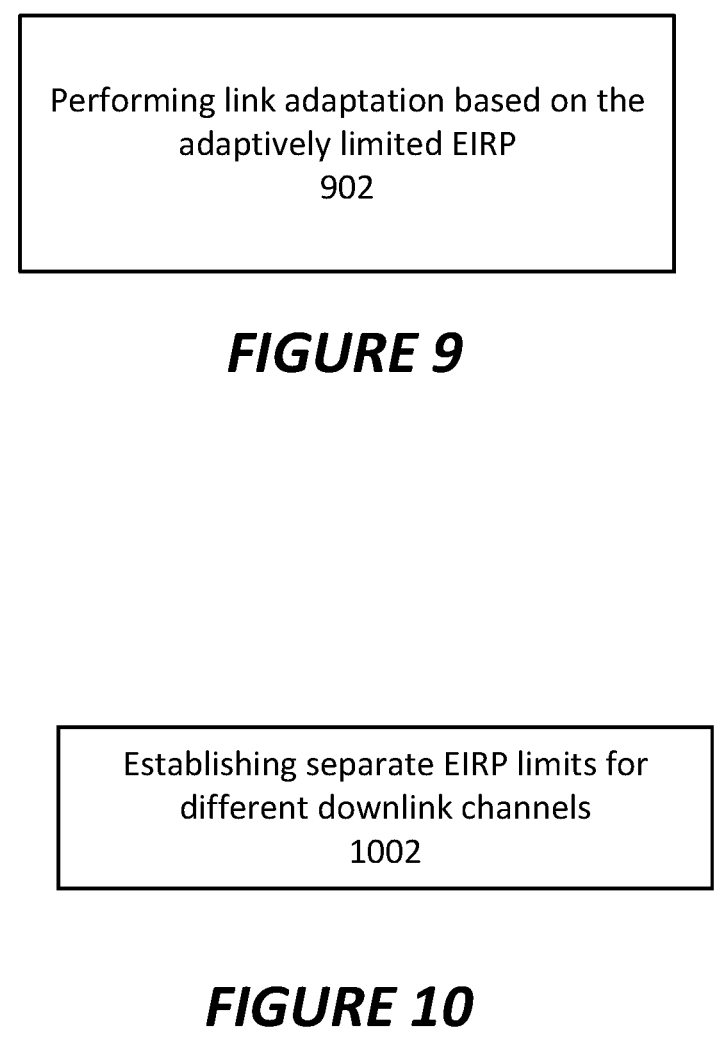

Performing link adaptation based on the
adaptively limited EIRP
902

FIGURE 9

Establishing separate EIRP limits for
different downlink channels
1002

FIGURE 10

BEGIN

QQ710
Host computer provides user
data

QQ720
Host computer initiates
transmission carrying the user
data to the UE

QQ730
UE receives the user data

END

SYSTEM AND METHODS FOR CONFIGURABLE EIRP RESTRICTION

CROSS REFERENCE TO RELATED APPLICATIONS

This application is a 35 U.S.C. § 371 national stage application of PCT International Application No. PCT/IB2020/058899 filed on Sep. 23, 2020, the disclosure and content of which is incorporated by reference herein in its entirety.

TECHNICAL FIELD

The present disclosure relates to wireless communication systems, and in particular to transmission power control in multi-antenna systems.

BACKGROUND

Active antenna system (AAS) technology is a key approach adopted in 4G LTE and 5G NR wireless communication standards to enhance wireless network performance, capacity and coverage by using multi-antenna approaches, such as diversity, spatial multiplexing and beamforming. Referring to FIG. 1, a typical AAS 100 for a radio network node consists of a two-dimensional array of antenna elements 101 arranged in M rows and N columns. The radio network node is a node that includes a transmitter for transmitting downlink signals to a wireless device, and may include, for example, a base station, a gNodeB, an eNodeB, a radio unit (RU), a transmit-receive point (TXRP), etc. Each antenna element 101 has K polarizations (K=2 in case of cross-polarization) as shown in FIG. 1. Antenna arrays can be used to implement multiple input-multiple output (MIMO) transmission in a wireless communication system. When more than four antennas are used by a radio network node, the system may be referred to as "massive MIMO" or mMIMO.

In the case of massive MIMO, because of the increased number of antenna elements in the antenna array, it is possible to have narrower beams with higher coverage compared to regular MIMO systems. By producing narrower beams, it is possible to increase the coverage of a radio network node by concentrating the beam in one narrow direction.

FIG. 2 illustrates beamforming by a radio network node 110 that employs an active antenna system for massive MIMO. As shown therein, the radio network node 110 including an AAS can generate a plurality of directional beams 115 for communicating with respective user equipment (UEs) 120. The use of such beamforming, sometimes referred to as spatial beamforming, can reduce interference and/or increase throughput and/or capacity of a wireless communication system. In particular, two or more of the beams 115 shown in FIG. 2 can be used to transmit signals to respective UEs 120 using the same time/frequency resources. When UEs are scheduled using the same time/frequency resources in the uplink (UL) or downlink (DL), they are said to be "paired." Signals transmitted to two different receivers by an AAS using the same time/frequency resources are said to be transmitted on different "layers." The number of layers that can be supported is based on the number of antenna elements used by the transmitter and receiver.

By concentrating power in a narrow beam, a beamforming gain is provided. For example, doubling the number of antennas at a base station can provide a 3 dB beamforming gain. However, such a concentration of power may require operators to increase the safety distance from antenna arrays compared to systems that do not use spatial beamforming.

FIG. 3 illustrates exclusion zones 140, 150 around a radio network node 110. The exclusion zones 140, 150 have different sizes, and represent the exclusion zone applicable to workers (140) and the general public (150), with the public having a larger exclusion zone.

The size of the safety distance from a radio network node 110 represented by the exclusion zone is a mandatory regulatory requirement. Regulatory limits are set by various health organizations and governmental bodies. For example, the International Commission on Non-Ionizing Radiation Protection (ICNIRP) which is endorsed by the World Health Organization (WHO) is an international commission that specializes in determining exposure limits for electromagnetic fields used by devices, such as cellular phones and base stations. For example, the ICNIRP promulgates guidelines for limiting exposure to time-varying electric, magnetic and electromagnetic fields (100 kHz to 300 GHz).

The most important factor in electromagnetic force (EMF) exposure in human health is believed to be the thermal effect in the body, i.e., increasing body temperature. Induced rotation of polar molecules such as $H_2O$ in the body converts radio frequency (RF) energy to heat by molecular friction. Therefore, requirements by ICNIRP are imposed to limit the adverse thermal effects of electromagnetic wave propagation. On top of ICNIRP recommendations, governments may have additional mandatory requirement for limiting exposure limits of RBS systems. Based on these requirements, equipment manufacturers and operators may determine EMF limit compliance boundaries (such as exclusion zones or safety distances) for the general public and workers for each product.

SUMMARY

A method of operating a radio network node in a wireless communication system according to some embodiments includes adaptively limiting effective isotropically radiated power, EIRP, of downlink signals transmitted by the radio network node on different physical channels.

By adaptively controlling EIRP on different physical channels, some embodiments can potentially increase cell coverage and/or improve UE/Cell throughput. That is, by controlling EIRP adaptively and independently on different channels, some embodiments described herein can potentially increase the cell coverage and/or improve UE/Cell throughput while complying with EIRP requirements.

In some embodiments, the radio network node may adaptively limit the EIRP of downlink signals by limiting the EIRP of downlink signals on different physical channels based on transmission gains associated with the different physical channels.

In some embodiments, the radio network node may adaptively limit the EIRP of downlink signals by limiting the EIRP of downlink signals on different physical channels based on a number of multiple input multiple output, MIMO, layers transmitted on the different physical channels.

In some embodiments, the radio network node may adaptively limit the EIRP of downlink signals by establishing a single EIRP density limit for all downlink channels, wherein EIRP density comprises an EIRP per unit of downlink bandwidth.

In some embodiments, the radio network node may adaptively limit the EIRP of downlink signals by establishing a single EIRP limit for all downlink channels.

In some embodiments, the EIRP limit is generated based on the EIRP density limit and a downlink bandwidth of the downlink signals.

The EIRP limit may be calculated as $EIRP_{limit}$=eirpDensity+10 log 10(BWDL), where eirpDensity is the EIRP density limit and BWDL is the downlink bandwidth for downlink signals.

In some embodiments, the radio network node may adaptively limit the EIRP of downlink signals by establishing separate EIRP limits for different downlink channels.

In some embodiments, the radio network node may adaptively limit the EIRP of downlink signals by establishing separate EIRP density limits for different downlink channels, wherein EIRP density comprises an EIRP per unit of downlink bandwidth.

In some embodiments, the radio network node may adaptively limit the EIRP of downlink signals by establishing separate power backoff levels for different downlink channels.

The method may further include estimating the transmission gain associated with a first downlink channel, and calculating an EIRP level for the first downlink channel based on the estimated transmission gain of the first channel.

The estimated transmission gain of the first channel may be based on a number of multiple input multiple output, MIMO, layers transmitted on the first channel.

The estimated transmission gain of the first channel may be based on one or more of a precoding gain, $G_{precoding}$, a port-to-antenna mapping gain, $G_{p2a}$, a beamforming gain, $G_{subarrayAndElement}$, a tuning gain, $G_{tuning}$, and a boost gain, $G_{boost}$.

The first channel may be a physical downlink shared channel associated with a wireless device, and the estimated transmission gain of the first channel, $G_{pdsch}$, may be calculated as:

$$G_{pdsch}=G_{precoding}+G_{p2a}+G_{subarrayAndElement}+G_{tuning}+G_{layersplit}+G_{boost}$$

where $G_{layersplit}$ represents a gain associated with a number of MIMO layers transmitted on the first channel.

The EIRP level for the first channel may be calculated as a sum of the transmission gain and the transmission power of the first channel. For example, the EIRP level for the first channel may be calculated as $EIRP_{pdsch}$=$G_{pdsch}$+TXPower, where TXPower represents the transmission power on the first channel.

The method may further include calculating an EIRP backoff as pdschEirpBackoff=max(0, EIRPpdsch−maxEirpTh), where maxEirpTh is a maximum EIRP threshold.

The method may further include adjusting a power of a signal transmitted on the first channel based on the EIRP backoff.

The method may further include determining if multiuser-MIMO is being used; and in response to determining that multi-user MIMO is being used, calculating the transmission gain of the first channel based in part on a multiuser MIMO gain, Gmu.

The first channel may be a single user MIMO channel, the estimated transmission gain of the first channel, $G_{pdsch}$, may be based on a reciprocity precoder gain, $G_{rat}$, that represents both a precoder gain and a port-to-antenna mapping gain.

The first downlink channel may be a physical downlink shared channel, PDSCH, a physical downlink control channel, PDCCH, a synchronization signal block, SSB, a channel state information reference signal, CSI-RS, a demodulation reference signal, DMRS, or a tracking reference signal, TRS.

The method may further include estimating a direction angle toward a wireless device associated with the first downlink channel, wherein the beamforming gain GsubarrayAndElement and the port-to-antenna mapping gain Gp2a are based on the direction angle.

The method may further include performing link adaptation of at least one downlink channel based on the adaptively limited EIRP of the downlink signals.

The method may further include updating a power control offset of a user equipment based on the adaptively limited EIRP of the downlink signals.

Some embodiments provide a radio network node configured to adaptively limit the effective isotropically radiated power, EIRP, of downlink signals transmitted by the radio network node on different physical channels.

A radio network node according to some embodiments includes a processing circuit, a transceiver coupled to the processing circuit, and a memory coupled to the processing circuit. The memory includes computer readable program instructions that, when executed by the processing circuit, cause the UE to adaptively limit the effective isotropically radiated power, EIRP, of downlink signals transmitted by the radio network node on different physical channels.

BRIEF DESCRIPTION OF THE DRAWINGS

FIGS. 5 to 10 are flowcharts that illustrate operations of a radio network node according to some embodiments.

DETAILED DESCRIPTION

Figure 1:
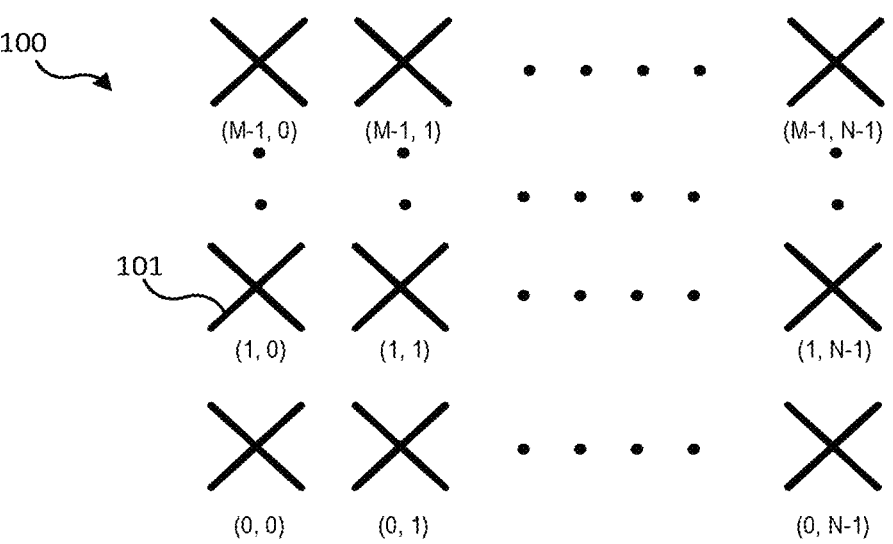
FIG. 1 illustrates a configuration of antennal elements in a MIMO antenna.
Figure 2:
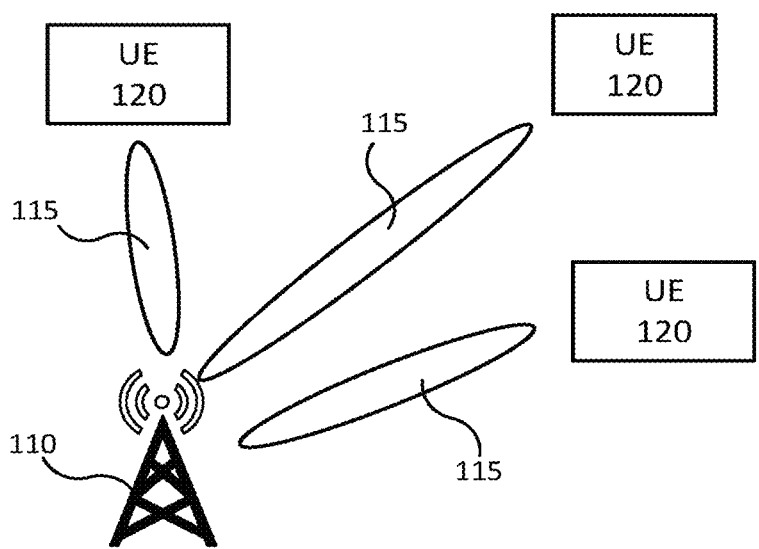
FIG. 2 illustrate transmission of antenna beams from a radio network node antenna to a plurality of UEs in a wireless communication system.
Figure 3:
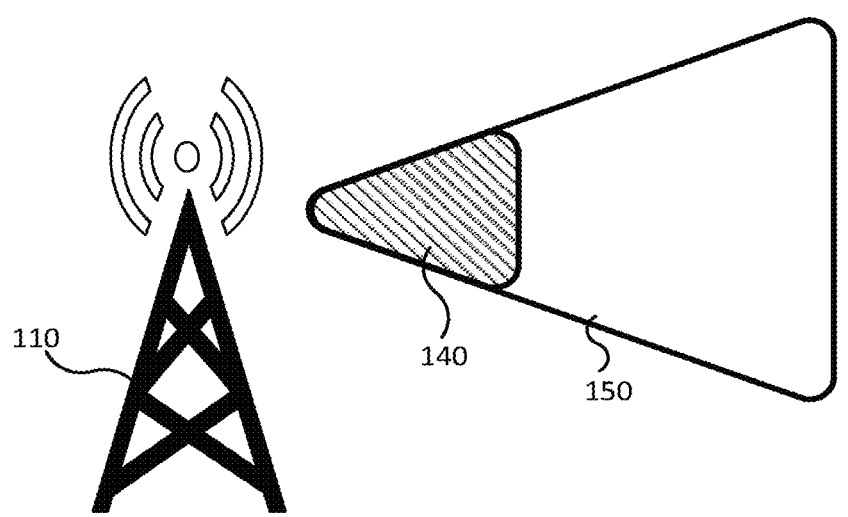
FIG. 3 illustrates exclusion zones around a radio network node antenna in a wireless communication system.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Some embodiments provide systems/methods for adaptively limiting the effective isotropically radiated power (EIRP) of downlink signals transmitted by the radio network node on different physical channels.

Effective isotropically radiated power (EIRP) is a metric that captures both transmit power and beamforming gain. EIRP is the product of transmitter power and the antenna gain in a given direction relative to an isotropic antenna of a radio transmitter. The more beamforming gain the radio network node has, the more EIRP it results in, and hence the more safety distance will be required.

Increasing the safety distance of a radio network node due to increased beamforming gain obtained thru mMIMO is problematic for practical reasons, especially in dense urban environments where base stations are closer to buildings and people. A simple way to resolve this issue and reduce the safety distance is to reduce the transmitted power of the radio network node. This approach is commonly done in practice, but may result in inefficient use of radio resources.

Downlink transmission can be categorized as feedback-based transmission or non-feedback-based transmissions. Non-feedback-based transmission can include broadcast signals or UE specific signals. For example in NR, the PBCH, PSS, SSS, and their associated DMRSs are non-feedback based channels/signals that are broadcast to all UEs in a cell. In codebook based transmissions, the PDCCH, PDSCH, and their associated DMRSs before CSI feedback (PMI/CQI/RI/CRI) are considered non-feedback-based channels/signals that are transmitted to a specific UE.

Beamforming techniques used in non-feedback-based transmissions may be called common channel beamforming, since they do not employ UE specific information. When PMI feedback is available or reciprocity-assisted transmissions (RAT) is employed, the PDSCH/PDCCH can be beamformed towards a specific UE to increase throughput and quality of service. For all these transmission modes in AAS systems, an operator may want to reduce EIRP in a certain cell. For example, there may be an agreement by operators to limit the cell EIRP in NR and LTE to reduce out of band emission probability which causes interference to other operators. As another example, there may be a requirement to limit instantaneous EIRP of the base station in cells that serve densely populated urban areas. Therefore, due to factors such as agreements among operators or strict regulatory requirements, the maximum EIRP of base stations in long-term evolution (LTE) and new radio (NR) is constrained.

EIRP limitation scales with the carrier bandwidth. For example, assume that for a 20 mhz carrier with 40 W (46 dBm) configured maximum transmit power, the EIRP of the transmitter should not exceed 63 dBm. Then for a 100 mhz carrier with 200 W (53 dBm) configured maximum transmit power, the EIRP of the transmitter should not exceed 70 dBm. Note that although the main target of such requirements is for AAS radios with large beamforming gains, non-AAS radios should also support such customer requirements. Accordingly, some embodiments described herein may apply to radios that do not include an AAS as well as those that do.

When limiting EIRP based on regulatory requirements, resource allocation in the frequency domain may be automatically adjusted to guarantee that time-averaged EIRP does not exceed a certain amount in the cell. However, because the EIRP limitation requirement scales with frequency bandwidth, adjusting resource allocation in the frequency domain may not accomplish the desired goal.

Some products reduce instantaneous EIRP by reducing a configured maximum transmission power of the NR sector carrier or by using a configurable input parameter to determine a power backoff value on only the PDSCH channel. The first approach may unnecessarily reduce the power and EIRP of all downlink channels by the same amount. Since EIRP is different in different downlink channels due to different beamforming gains (BFG), it may not be necessary to reduce the EIRP of all channels by the same amount. For example, broadcast channels/signals, such as SSB, may be transmitted with wide beams which inherently have smaller BFG compared to UE specific channels such as PDSCH, which are transmitted with narrow beams which in turn have larger BFG compared to wide beams. Therefore, it may not be needed to reduce the power of the SSB, but it may only be required to reduce PDSCH power. The second approach, which addresses this shortcoming of the first approach, does not consider the impact of number of layers in transmission. It can only apply a static backoff factor to the PDSCH.

A solution for controlling the EIRP limit according to some embodiments may enforce a threshold on EIRP and selectively apply a required backpoff on all downlink channels/signals automatically. That is, by employing some embodiments described herein, operators need not calculate power backoff factors of each channel based on the beamforming gain and other EIRP related parameters of the channel. Rather, they may only need to determine their requirements on EIRP to the radio network node, and system manages the EIRP limit automatically.

Some embodiments described herein provided systems and/or methods that perform automatic power backoff on multiple downlink channels AAS-enabled and non-AAS enabled radio network nodes.

Some embodiments provide adaptive power back-off on downlink channels/signals in wireless communication systems such as systems that implement the NR or LTE standards, by considering the impact of single-layer and multi-layer SU and MU MIMO transmission. In particular, some embodiments provide new configuration management systems/methods for EIRP power backoff and/or algorithms for adaptive power adjustment to restrict EIRP.

Some embodiments adaptively adjust the power level of the PDSCH for one or more UEs in each group of resource blocks (RB) by considering the number of layers that is transmitted to the UE. Moreover, some embodiments adaptively adjust the power level of signals transmitted on channels other than the PDSCH, such as other UE-specific or common channels. Compared to previous approaches (e.g., the use of an input parameter for power backoff and configuring overall radio power), some embodiments described herein can potentially increase cell coverage and/or improve UE/Cell throughput.

In addition to adaptive power backoff, some embodiments may include changes to other aspects of radio network node operation that may improve UE/cell throughput when EIRP restriction is employed. For example, some embodiments may include an update to the PDSCH or PDCCH link adaptation (LA) algorithms update to reflect the impact of PDSCH/PDCCH power backoff. Some embodiments may include an update to the calculation of the power control offset (e.g., as represented by the NZP-CSI-RS-Resource information element IE) of one or more UEs due to PDSCH power backoff. Some embodiments may further include an update to the calculation of ss-PBCH block power (e.g., as represented by the ssb-PBCH-BlockPower IE) that is broadcast to the UE and that represents the average energy per resource element (EPRE) of the resource elements that carry secondary synchronization signals that the network used for SSB transmission.

The embodiments described herein may not increase the power of PDSCH, but rather but adjust the power back-off level on a per-channel basis.

In conventional approaches, EIRP can be controlled by reducing the configured power of the radio or/and using an input parameter to reduce transmission power of the PDSCH. However, both of these approaches may result in unnecessary throughput loss in multi-user MIMO (MU-MIMO) and multi-layer single user MIMO (SU-MIMO) transmission. Some embodiments described herein can potentially increase the cell coverage and/or improve UE/Cell throughput while complying with EIRP requirements. Additionally, the system operator may not need to know the gain of different channels and to calculate the backoff amount. The operator is only required to configure a threshold on the upper bound of EIRP, and a system/method according to embodiments described herein can automatically back-off the transmission power of downlink channels/signals including the PDSCH to satisfy the EIRP limit.

In small/medium cell macro scenarios when an operator does not configure the radio with full power, some embodiments described herein can be used instead of redundantly reducing the configured maximum transmit power (configuredMaxTxPower) of a radio network node to improve cell throughput.

Some embodiments described herein can be used to reduce electromagnetic propagation in sensitive areas for public health and electronic device protection. Moreover, some embodiments described herein can be used to reduce the safety distance and exclusion zone of the base station.

Additionally, some embodiments described herein can be used to reduce probability of out of band blocking of other operators.

Some embodiments described herein may provide instantaneous (as opposed to time-averaged) power backoff on the PDSCH with consideration of throughput degradation.

Assuming a radio network node is limited to supported up to L layers in MU-MIMO, some embodiments described herein can result in up to $10 \log_{10}(L)$ dB or more performance boost of PDSCH for each UE in codebook-based MU-MIMO transmission. Assuming the product is limited to support up to L' layers in SU-MIMO, this feature can result in up to $10 \log_{10}(L')$ dB performance boost of PDSCH for the UE in codebook-based SU-MIMO transmission (e.g., the maximum gain is achieved in L' layer transmission and some cases in 2 layer transmission). The baseline for comparison is when configuredMaxTxPower of the cell is reduced to satisfy EIRP limitation.

According to some embodiments, one configurable parameter is used to determine the maximum allowed EIRP. It is also possible to have multiple configurable parameters for each downlink channel (for example on PDSCH, PDCCH, TRS, SSB, etc.). By using multiple configurable parameters, an operator can control the EIRP of each channel/signal independently to achieve a balanced link budget on different downlink channels to improve power consumption of the base station and for better cell planning.

Configuration Management

In some embodiments, an EIRP limit is provided for one or more downlink channels, or each downlink channel is provided with a different EIRP limit. There are several possible configuration approaches for providing an EIRP limit, some of which are described below.

Configuration Management Embodiment 1—One EIRP Density Limit

According to some embodiments, an EIRP density limit is provided that can be applied to all DL channels and all bandwidths. An EIRP density limit (e.g., eirpDensity) may be provided to define a maximum allowed EIRP per unit of bandwidth, e.g., an EIRP limit per MHz. The value of EIRP density can be in log scale or linear scale.

The EIRP limit can then be calculated based on the DL bandwidth and EIRP density, for example if eirpDensity is in dBm/MHz and downlink bandwidth, dlBW, is in MHz, then the EIRP limit can be calculated as:

$$\text{EIRP (dBm)} = \text{eirpDensity} + 10 \log 10(\text{dlBW})$$

Configuration Management Embodiment 2—Multiple EIRP Density Limit

In some embodiments, multiple EIRP density limits may be provided. Each EIRP density limit may be applied to one or multiple DL channels.

For example, an EIRP density in frequency may be defined for DL channel X (e.g., eirpDensityX) as a maximum allowed EIRP per a unit of bandwidth for channel X, e.g., an EIRP limit per MHz for channel X. The value of EIRP density can be in log scale or linear scale.

In addition, an EIRP density in frequency may be defined for DL channel Y (e.g., eirpDensityY) as a maximum allowed EIRP per unit bandwidth for channel Y, e.g., an EIRP limit per MHz for channel Y.

The EIRP limit for each channel can be calculated based on the DL bandwidth and EIRP density associated with the channel For example if eirpDensityX is in expressed W/MHz and downlink bandwidth band (dlBW), is in MHz, then the EIRP limit can be calculated as:

$$\text{EIRP (W)} = \text{eirpDensity} X \times \text{dlBW}$$

Configuration Management Embodiment 3—One EIRP Limit

According to some embodiments, one EIRP limit may be provided that can be applied to all DL channels and for the given bandwidth.

For example, a parameter EIRP may be defined that corresponds to the maximum allowed EIRP for the configured frequency bandwidth. The value of EIRP limit (EIRP) can be in log scale (dBm or dBW or etc,) or linear scale (W or mW or etc.).

Configuration Management Embodiment 4—Multiple EIRP Limits

According to further embodiments, multiple EIRP limits may be provided. For example, an EIRP limit may be defined for one or multiple DL channels for a given bandwidth.

In an example, a value of EIRP for DL channel X (eirpX) may be defined as the maximum allowed EIRP for the configured bandwidth of the cell for channel X, where the value of EIRP can be in log scale or linear scale. In addition, a value of EIRP for DL channel Y (eirpY) may be defined as the maximum allowed EIRP for the configured bandwidth of the cell for channel Y, where the value of EIRP can be in log scale or linear scale.

Configuration Management Embodiment 5 (Multiple Power Backoff Values):

As noted above, one conventional approach for EIRP restriction is based on an input parameter where the power backoff value of the PDSCH channel is provided by the operator. Some embodiments provide an extension to the concept of an input parameter by providing multiple power backoff values, e.g., one for each DL channel or for multiple DL channels, which are to be given as an input for the given bandwidth.

In an example, a power backoff for a DL channel X (backoffX) may be defined, where the value of backoffX can be in log scale or linear scale. In addition, a power backoff for DL channel Y (backoffY) may be defined, where the value of backoffX can be in log scale or linear scale.

According to some embodiments, a power backoff may be statically or dynamically applied to different downlink channels/signals to limit EIRP.

Power Control Embodiment 1—Static Power Backoff as Input

In a first embodiment, a static power control approach may be used in connection with a configuration management scheme in which multiple power backoff values are provided for different channels or groups of channels. In this embodiment, the power backoff values are applied to their corresponding downlink channels.

In some embodiments, the power backoff value is provided in linear scale as a scaling factor. Before DL channels become indistinguishable in the radio network node, the scaling factor is multiplied in the digital or analog domain by the amplitude of the transmit signals. In other embodiments, the scaling factor could be multiplied with the precoder, initial power, or any other operation during downlink transmission. This approach requires operator to have knowledge of different level of beamforming gains in addition to any power related boosting/deboosting operation on each downlink channel in the system.

Power Control Embodiment 2—Power Backoff for Codebook Based SU-MIMO:

In this and the following embodiments, it is assumed that the given input on EIRP is already scaled if necessary and that the EIRP threshold on the full bandwidth is available (referred to herein as maxEirpThreshold).

In this embodiment, the transmission gain or loss of the UE specific channels, for example the PDSCH channel, is calculated. Then, EIRP is calculated based on the gain/loss and transmission power of the cell/sector carrier. If EIRP exceeds the threshold maxEirpThreshold, the radio network node applies a corresponding backoff to the transmit power of the channel.

An important aspect in calculating the gain/loss factor is the impact of multi-layer transmission. If multiple layers are transmitted, the transmit power is split among the layers. Therefore, if the layers are sent in different directions, EIRP will be reduced, which will result in less power backoff and consequently more coverage and throughput.

The gain/loss factor due to splitting power among layers is represented as $G_{layerSplit}$ in the algorithm below. Other factors that can impact EIRP calculation of the PDSCH channel in codebook based SU-MIMO transmission are the gain resulting from antenna subarray with isotropic or non-isotropic antenna elements ($G_{subarrayAndElement,\ max}$), the gain resulting from precoding ($G_{precoding}$), the gain resulting from port to antenna mapping ($G_{p2a,\ max}$), the gain resulting from power boosting/deboosting ($G_{boost}$), and a gain adjustment based on a tuning parameter that could adjust the EIRP calculation based on practical measurements ($G_{tuning}$).

In general, a gain (represented in decibels, dB) may be negative or positive. That is, a gain can represent a boosting or deboosting effect. For example the layer split gain ($G_{layersplit}$) is always negative or zero.

The following algorithm can be used for power backoff:

Algorithm 1:
1.0 The parameters $G_{subarrayAndElement,max}$, $G_{tuning}$, TransmissionPowerInDb, maxEirpThreshold are provided for each Cell/Sector Carrier, where TransmissionPowerInDb represents transmission power in decibels.
2.0 Then, for each UE:
    2.1 The parameters $G_{p2a,\ max}$, $G_{boost}$, nrofCsirsPorts, nroflLayers are provided, where nrofCsirsPorts represents the number of CSI-RS ports configured at the UE, and nroflLayers represents the number of layers configured for the UE.
    2.2 $G_{precoding} = 10\ \log_{10}(\text{nrofCsirsPorts}/2)$ is calculated.
    2.3 If (number of transmission layers is one) or (number of transmission layers is greater than one and two layers are transmitted on the same directions but different polarizations), then
        $G_{layerSplit} = 10\log_{10}(1/\text{nrofLayers})$
    else
        $G_{layerSplit} = 10\log_{10}(2/\text{nroflLayers})$
    End
    2.4 $G_{pdsch}$ is calculated for the UE's PDSCH as:
        $G_{pdsch} = G_{precoding} + G_{p2a,\ max} + G_{subarrayAndElement,\ max} + G_{tuning} + G_{layerSplit} + G_{boost}$
    2.5 EIRP for the UE's PDSCH is calculated as:
        $EIRP_{pdsch} = G_{pdsch} + \text{TransmissionPowerInDb}$
    2.6 The backoff for the UE's PDSCH is then calculated as:
        $\text{pdschEirpBackoffInDb} = \max(0,\ EIRP_{pdsch}-\text{maxEirpTh})$
    2.7. Update information carrying capacity (ICC) and SINR calculation of SU-MIMO PDSCH link adaptation based on the calculated backoff value.
    2.8 The EIRP backoff (linear value) is then calculated as:

$$pdschEirpBackoffLinear = 10^{\frac{-pdschEirpBackoffInDB}{20}}$$

2.9 The amplitude of the transmit signal is then multiplied by pdschEirpBackoffLinear.
3.0 End of algorithm Power Control Embodiment 3—Power Backoff for Codebook Based MU-MIMO Similar to power control embodiment 2 above, in this embodiment, the transmission gain or loss of the UE specific channels, such as the PDSCH channel, is calculated. Then, EIRP is calculated based on the gain/loss and transmission power of the cell/sector carrier. If EIRP exceeds the EIRP threshold maxEirpThreshold, a backoff is applied to the transmit power of the channel.

An important difference with SU-MIMO is the possible variation of power allocation (backoff) in each group of resource blocks. It is possible that in one physical resource block (PRB) there are L users scheduled for concurrent MU transmission, but in the next PRB, there are L' users co-scheduled for MU transmission. Additionally, MU-MIMO may result in additional processing which could change the transmission gain/loss and therefore EIRP. This gain/loss maybe represented by the factor $g_{MU}$.

The following algorithm can be used for power backoff for both SU and MU transmissions:

---

Algorithm 2:
1.0 The parameters $G_{subarrayAndElement,max}$, $G_{tuning}$, TransmissionPowerInDb, maxEirpThreshold are provided for each Cell/Sector Carrier.
2.0 For each UE:
    2.1 The parameters $G_{p2a,\ max}$, $G_{boost}$, nrofCsirsPorts, nrofLayers and $g_{MU}$ are provided.
    2.2 $G_{precoding} = 10\ \log_{10}$(nrofCsirsPorts/2) is calculated.
    2.3 Then, for each PRB, resource block group (RBG) or group of PRBs:
        2.3.1 The parameter nrof/TotalLayers is provided, which represents the total number of layers of all UEs that are co-scheduled for MU transmission in this RBG.
        2.3.2 If (number of transmission layers of the UE in this RBG is one) or (number of transmission layers of the UE in this RBG is greater than one and two layers are transmitted on the same directions but different polarizations), then
        $G_{layerSplit} = 10\log_{10}$(1/nrofTotalLayers)
    else
        $G_{layerSplit} = 10\log_{10}$(2/nrof/TotalLayers)
    End
    2.4 If MU-MIMO, then
        $G_{mu} = g_{MU}$
    else
        $G_{mu} = 0$
    End
    2.5 $G_{pdsch}$ is calculated for the PRB/RBG/group of RBs as:
    $G_{pdsch} = G_{precoding} + G_{p2a,\ max} + G_{subarrayAndElement,max} + G_{tuning} + G_{layerSplit} + G_{boost} + G_{mu}$
    2.6 EIRP for the PDSCH is calculated as:
    $EIRP_{pdsch} = G_{pasch} + $ TransmissionPowerInDb
    2.7 The backoff for the PDSCH is then calculated as:
    pdschEirpBackoffInDb $= \max(0, EIRP_{pdsch}-$maxEirpTh)
    2.8. Update information carrying capacity (ICC) and SINR calculation of SU-MIMO PDSCH link adaptation based on the calculated backoff value.
    2.9 The EIRP backoff (linear value) is then calculated as:

$$pdschEirpBackoffLinear = 10^{\frac{-pdschEirpBackoffindB}{20}}$$

2.10 The amplitude of the transmit signal is then multiplied by pdschEirpBackoffLinear.
3.0 End of algorithm

---

Power Control Embodiment 4—Power Backoff on SU and MU RAT

Similar to Power Control Embodiment 3 above, in this embodiment, the transmission gain or loss of the UE specific channels, such as the PDSCH channel, is calculated. Then, EIRP is calculated based on the gain/loss and transmission power of the cell/sector carrier. If EIRP exceeds the EIRP threshold maxEirpThreshold, then a backoff is applied to the transmit power of the channel. The difference with code-book-based SU MIMO is that $(G_{precoding})$ and $(G_{p2a,\ max})$ cannot be separated. The two gains are combined and calculated as one gain, referred to as the reciprocity precoder gain, $G_{rat}$, which is estimated or approximated based on the maximum gain of the precoder for different layers of each UE.

The following algorithm can be used for power backoff for both SU and MU transmissions:

---

Algorithm 3:
1.0 The parameters $G_{subarrayAndElement,max}$, $G_{tuning}$, TransmissionPowerInDb, maxEirpThreshold are provided for each Cell/Sector Carrier.
2.0 For each UE:
    2.1 The parameters $G_{boost}$, nroflLayers and $g_{MU}$ are provided.
    2.2 Then, for each PRB, resource block group (RBG) or group of PRBs:
        2.3.1 The parameter nroflTotalLayers is provided.
        2.3.2 If (number of transmission layers of the UE in this RBG is one) or (number of transmission layers of the UE in this RBG is greater than one and two layers are transmitted on the same directions but different polarizations), then
        $G_{layerSplit} = 10\log_{10}$(1/nroflTotalLayers)
    else
        $G_{layerSplit} = 10\log_{10}$(2/nroflTotalLayers)
    End
    2.4 If MU-MIMO, then
        $G_{mu} = g_{MU}$
    else
        $G_{mu} = 0$
    End
    2.5 Approximate $G_{rat}$.
    2.5 $G_{pdsch}$ is calculated for the PRB/RBG/group of RBs as:
    $G_{pdsch} = G_{rat} + G_{subarrayAndElement,max} + G_{tuning} + G_{layerSplit} + G_{boost} + G_{mu}$
    2.6 EIRP for the PDSCH is calculated as:
    $EIRP_{pdsch} = G_{pdsch} + $ TransmissionPowerInDb
    2.7 The backoff for the PDSCH is then calculated as:
    pdschEirpBackoffInDb $= \max(0, EIRP_{pdsch}-$maxEirpTh)
    2.8. Update information carrying capacity (ICC) and SINR calculation of SU-MIMO PDSCH link adaptation based on the calculated backoff value.
    2.9 The EIRP backoff (linear value) is then calculated as:

$$pdschEirpBackoffLinear = 10^{\frac{-pdschEirpBackoffindB}{20}}$$

2.10 The amplitude of the transmit signal is then multiplied by pdschEirpBackoffLinear.
3.0 End of algorithm

---

Power Control Embodiment 5—Power Backoff on Other Downlink Channels:

In NR, all other channels than PDSCH only support single layer transmissions. Thus, in some embodiments, Algorithm 1 that was proposed for Power Control Embodiment 2 may be used for all other channels with a small modification to the gain/loss calculation. In particular, the gain/loss calculation of each channel may be calculated separately, e.g.:
For CSI-RS:

$$G_{csi-rs} = G_{p2a,max} + G_{subarrayAndElement,max} + G_{boost} + G_{tuning}$$

and $$EIRP_{csi-rs} = G_{csi-rs} + TransmissionPowerInDb -$$

$$10\log_{10}\frac{nrofAntennaPorts}{nrofCsirsPorts} \times cdmGroupSize$$

For PDCCH:

$$G_{pdcch} = G_{pdcch} + G_{subarrayAndElement,max} + G_{boost} + G_{tuning}$$

$$EIRP_{pdcch} = G_{pdcch} + TransmissionPowerInDb$$

For TRS:

$$G_{trs} = G_{trs} + G_{subarrayAndElement,max} + G_{boost} + G_{tuning}$$

$$EIRP_{trs} = G_{trs} + TransmissionPowerInDb$$

For SSB:

$$G_{ssb}=G_{ssb}+G_{subarrayAndElement,max}+G_{boost}+G_{tuning}$$

$$EIRP_{ssb}=G_{ssb}+\text{TransmissionPowerInDb}$$

In the above calculations, the downlink channels may employ spatial filters that may vary among different transmission instances of the channel, and may result in different gains per spatial filter (e.g., $G_{ssb}$, $G_{p2a\text{-}max}$, etc.). In such cases, the radio network node applies the associated maximum gain value for the associated spatial filter for each transmission instance.

In cases where received CSI-RS power level is required to be associated with received PDSCH power at the receiver side, if the EIRP related power back off (in dB) is smaller than the maximum attainable power back-off for PDSCH by some threshold value $\delta_{th}$, then the gNB may apply an additional power backoff value of $\Delta_{csi\text{-}rs}=f(\delta_{th}, N_{CDM})$ to the CSI-RS power value $EIRP_{csi\text{-}rs}$ where $N_{CDM}$ is the number of CSI-RS pilot tones superposed on the same resource elements. The function $f(\ )$ can be selected along with the adaptive MCS link-adaptation parameters informed to the receiver.

Power Control Embodiment 6—Directional Power Back-off on UE Specific Transmission Considering the fact that radiation pattern of antenna subarray is not is isotropic in most cases, further improvements can be made to the system performance (in terms of throughput and coverage) by considering a 2D or 3D direction radiation pattern instead of using the maximum gain. This approach is only applicable to UE specific signals with UE specific beamforming. That is, the beam should be directed towards a different direction than the broadside of the array. The general format of the algorithm is similar to Algorithm 2 above. In this case, for codebook-based SU and MU precoding of PDSCH channel the gain/loss factor can be expressed as:

$$G_{pdsch}=G_{precoding}+G_{p2a}(\phi,\theta)+G_{subarrayAndElement}$$
$$(\phi,\theta)+G_{tuning}+G_{layersplit}+G_{mu}+G_{boost}$$

where $\phi,\theta$ are spherical coordinates.

In this embodiment, direction estimation is needed for determining the propagation direction of each layer of each UE. For each UE, the direction closest to the boresight would be selected for gain calculation. In other words, the maximum gain among the layers is selected to guarantee that the EIRP restriction is never violated.

For systems with precoder matrix indices that are fed back to the radio network node, a look-up table can be generated per PMI, or azimuth and elevation indices of the PMI if it has more than one dimension. This table contains, for each PMI index, the antenna element or subarray gain corresponding to the direction at which the PMI creates maximum directivity. The table may include the impact of only azimuth, only elevation, or both azimuth and elevation beamforming (3D beamforming) related gains. Based on the PMI index used for transmission, the radio network node may reduce the power back-off value by the difference between maximum subarray gain attainable and the gain corresponding to the PMI index.

Figure 4:
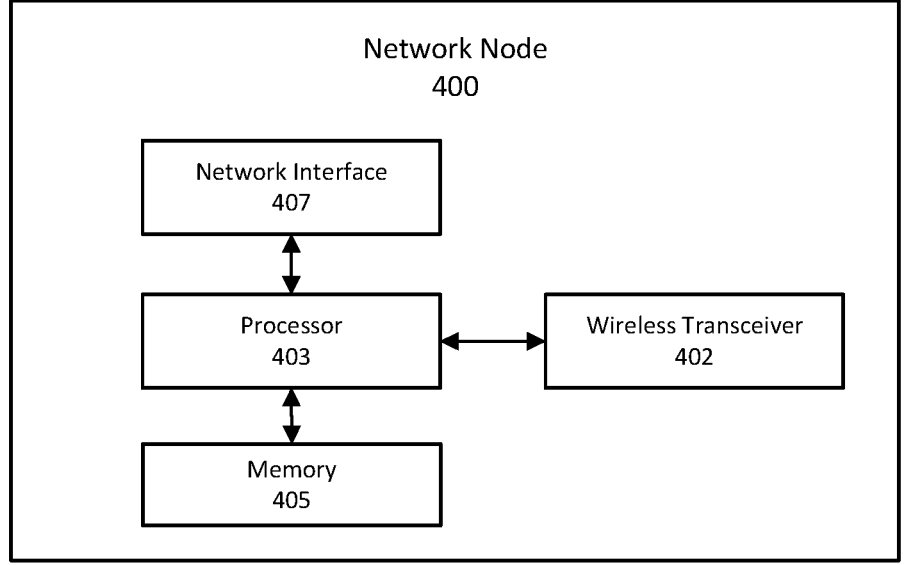
FIG. 4 is a block diagram illustrating a radio network node according to some embodiments of the inventive concepts.

FIG. 4 is a block diagram illustrating elements of a network node 400 of a communication system. The network node 400 may correspond to a RAN node, or portion of a RAN node, that includes a wireless transceiver and transmit antenna, such as a radio base station, a transmit-receive point (TXRP), a radio unit (RU), etc. For example, the radio network node 400 may implement a gNodeB or eNodeB.

As shown, the network node may include a network interface circuit 407 (also referred to as a network interface) configured to provide communications with other nodes (e.g., with other base stations, RAN nodes and/or core network nodes) of the communication network. The network node 400 may also include a wireless transceiver circuit 402 for providing a wireless communication interface with UEs. The radio network node 400 may also include a processor circuit 403 (also referred to as a processor) coupled to the transceiver circuit 402 and the network interface 407, and a memory circuit 405 (also referred to as memory) coupled to the processor circuit. The memory circuit 405 may include computer readable program code that when executed by the processor circuit 403 causes the processor circuit to perform operations according to embodiments disclosed herein. According to other embodiments, processor circuit 403 may be defined to include memory so that a separate memory circuit is not required.

As discussed herein, operations of the radio network node may be performed by processor 403, the wireless transceiver circuit 402 and/or the network interface 407. For example, the processor 403 may control the network interface 407 to transmit communications through network interface 407 to one or more other radio network nodes and/or to receive communications through network interface from one or more other radio network nodes. Moreover, modules may be stored in memory 405, and these modules may provide instructions so that when instructions of a module are executed by processor 403, processor 403 performs respective operations (e.g., operations discussed herein with respect to Example Embodiments).

Figures 5, 6:
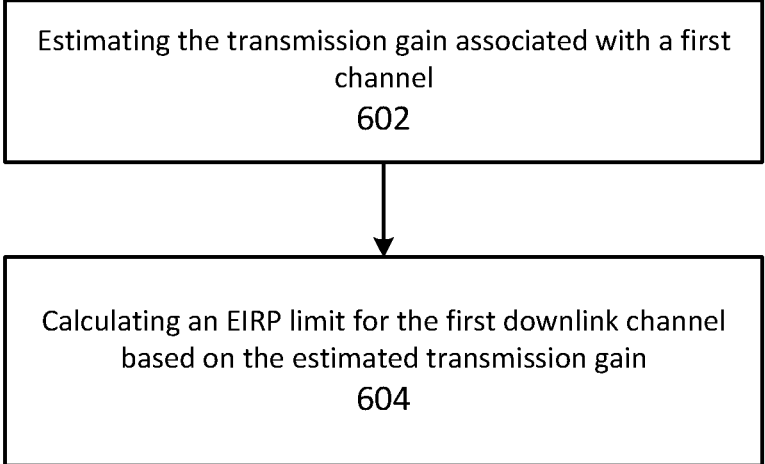

FIG. 5 illustrates operations of a radio network node according to some embodiments. Referring to FIG. 5, a radio network node according to some embodiments adaptively limits the EIRP of downlink signals transmitted by the radio network node on different physical channels (block 502).

Referring to FIGS. 4 and 5, a radio network node (400) according to some embodiments is configured to perform operations of adaptively limiting the EIRP of downlink signals transmitted by the radio network node on different physical channels (block 502).

In some embodiments, the radio network node may adaptively limit the EIRP of downlink signals by limiting the EIRP of downlink signals on different physical channels based on transmission gains associated with the different physical channels.

In some embodiments, the radio network node may adaptively limit the EIRP of downlink signals by limiting the EIRP of downlink signals on different physical channels based on a number of multiple input multiple output, MIMO, layers transmitted on the different physical channels.

In some embodiments, the radio network node may adaptively limit the EIRP of downlink signals by establishing a single EIRP density limit for all downlink channels, wherein EIRP density comprises an EIRP per unit of downlink bandwidth.

In some embodiments, the radio network node may adaptively limit the EIRP of downlink signals by establishing a single EIRP limit for all downlink channels.

In some embodiments, the EIRP limit is generated based on the EIRP density limit and a downlink bandwidth of the downlink signals.

The EIRP limit may be calculated as $EIRP_{limit}=\text{eirpDensity}+10 \log 10(\text{BWDL})$, where eirpDensity is the EIRP density limit and BWDL is the downlink bandwidth for downlink signals.

In some embodiments, the radio network node may adaptively limit the EIRP of downlink signals by establishing separate EIRP limits for different downlink channels.

In some embodiments, the radio network node may adaptively limit the EIRP of downlink signals by establishing separate EIRP density limits for different downlink channels, wherein EIRP density comprises an EIRP per unit of downlink bandwidth.

In some embodiments, the radio network node may adaptively limit the EIRP of downlink signals by establishing separate power backoff levels for different downlink channels.

Referring to FIG. 6, in some embodiments, the method includes estimating the transmission gain associated with a first downlink channel (block 602), and calculating an EIRP level for the first downlink channel based on the estimated transmission gain of the first channel (block 604).

The estimated transmission gain of the first channel may be based on a number of multiple input multiple output, MIMO, layers transmitted on the first channel.

In some embodiments, the estimated transmission gain of the first channel may be based on one or more of a precoding gain, $G_{precoding}$, a port-to-antenna mapping gain, $G_{p2a}$, a beamforming gain, $G_{subarrayAndElement}$, a tuning gain, $G_{tuning}$, and a boost gain, $G_{boost}$.

The first channel may be a physical downlink shared channel associated with a wireless device, and the estimated transmission gain of the first channel, Gpdsch, may be calculated as:

$$G_{pdsch}=G_{precoding}+G_{p2a}+G_{subarrayAndElement}+G_{tuning}+G_{layersplit}+G_{boost}$$

where Glayersplit represents a gain associated with a number of MIMO layers transmitted on the first channel.

The EIRP level for the first channel may be calculated as a sum of the transmission gain and the transmission power of the first channel. For example, the EIRP level for the first channel may be calculated as $EIRP_{pdsch}=G_{pdsch}+TXPower$, where TXPower represents the transmission power on the first channel.

The method may further include calculating an EIRP backoff as pdschEirpBackoff=max(0, EIRPpdsch−maxEirpTh), where maxEirpTh is a maximum EIRP threshold.

The method may further include adjusting a power of a signal transmitted on the first channel based on the EIRP backoff.

Figure 7:
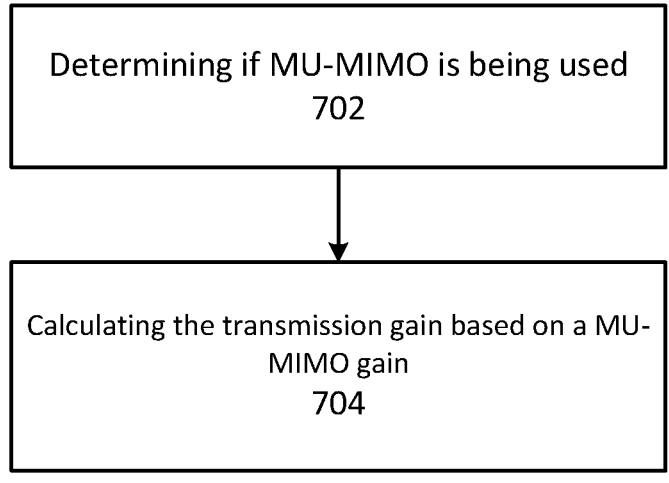

Referring to FIG. 7, the method may further include determining if multiuser-MIMO is being used (block 702), and in response to determining that multi-user MIMO is being used, calculating the transmission gain of the first channel based in part on a multiuser MIMO gain, $G_{mu}$ (block 704).

The first channel may be a single user MIMO channel, the estimated transmission gain of the first channel, $G_{pdsch}$, may be based on a reciprocity precoder gain, $G_{rat}$, that represents both a precoder gain and a port-to-antenna mapping gain.

The first downlink channel may be a physical downlink shared channel, PDSCH, a physical downlink control channel, PDCCH, a synchronization signal block, SSB, a channel state information reference signal, CSI-RS, a demodulation reference signal, DMRS, or a tracking reference signal, TRS.

Figure 8:
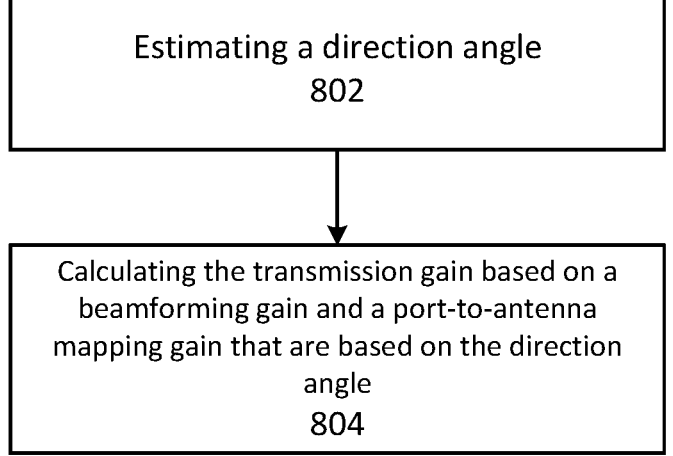

Referring to FIG. 8, the method may further include estimating a direction angle toward a wireless device associated with the first downlink channel, wherein the beamforming gain $G_{subarrayAndElement}$ and the port-to-antenna mapping gain $G_{p2a}$ are based on the direction angle.

Referring to FIG. 9, the method may further include performing link adaptation of at least one downlink channel based on the adaptively limited EIRP of the downlink signals (902).

Referring to FIG. 10, the method may further include updating a power control offset of a user equipment based on the adaptively limited EIRP of the downlink signals (1002).

Referring to FIGS. 4 and 5, a radio network node (400) according to some embodiments includes a processing circuit (403), a transceiver (402) coupled to the processing circuit, and a memory (405) coupled to the processing circuit. The memory includes computer-readable program instructions that, when executed by the processing circuit, cause the processing circuit to perform operations of adaptively limiting the EIRP of downlink signals transmitted by the radio network node on different physical channels (block 502).

Explanations are provided below for abbreviations that are mentioned in the present disclosure.

ABBREVIATION EXPLANATION

AAS active antenna system
BF beamforming
BFG beamforming gain
BFW beamforming weight
CPRI common public radio interface
CQI channel quality indicator
CRI CSI-RS resource indicator
CSI channel state information
CSI-RS CSI reference signal
DL downlink
DMRS demodulation reference signal
eCPRI enhanced CPRI
EIRP effective isotropically radiated power
EMF electromagnetic force
ICC information carrying capacity
ICNIRP International Commission on Non-Ionizing Radiation Protection
IE information element
LA link adaptation
LTE long term evolution
MIMO multiple input multiple output
mMIMO massive MIMO
MOM managed object model
MU multiuser
MU-MIMO multiuser MIMO
NR new radio
PBCH physical broadcast channel
PDCCH physical downlink control channel
PDSCH physical downlink shared channel
PMI precoding matric indicator
PSS primary synchronization signal
RAT reciprocity assisted transmission
RB resource block
RBS radio base station
RF radio frequency
RI rank indicator
SINR signal to interference and noise ratio
SSB synchronization signal block
SSS secondary synchronization signal
SU single user
SU-MIMO single user MIMO

17

TRS tracking reference signal
UE user equipment
WHO world health organization
Further definitions and embodiments are discussed below.

In the above-description of various embodiments of present inventive concepts, it is to be understood that the
terminology used herein is for the purpose of describing
particular embodiments only and is not intended to be
limiting of present inventive concepts. Unless otherwise
defined, all terms (including technical and scientific terms)
used herein have the same meaning as commonly under-
stood by one of ordinary skill in the art to which present
inventive concepts belong. It will be further understood that
terms, such as those defined in commonly used dictionaries,
should be interpreted as having a meaning that is consistent
with their meaning in the context of this specification and the
relevant art and will not be interpreted in an idealized or
overly formal sense unless expressly so defined herein.

When an element is referred to as being "connected",
"coupled", "responsive", or variants thereof to another element, it can be directly connected, coupled, or responsive to
the other element or intervening elements may be present. In
contrast, when an element is referred to as being "directly
connected", "directly coupled", "directly responsive", or
variants thereof to another element, there are no intervening
elements present. Like numbers refer to like elements
throughout. Furthermore, "coupled", "connected", "respon-
sive", or variants thereof as used herein may include wire-
lessly coupled, connected, or responsive. As used herein, the
singular forms "a", "an" and "the" are intended to include
the plural forms as well, unless the context clearly indicates
otherwise. Well-known functions or constructions may not
be described in detail for brevity and/or clarity. The term
"and/or" includes any and all combinations of one or more
of the associated listed items.

It will be understood that although the terms first, second,
third, etc. may be used herein to describe various elements/
operations, these elements/operations should not be limited
by these terms. These terms are only used to distinguish one
element/operation from another element/operation. Thus a
first element/operation in some embodiments could be
termed a second element/operation in other embodiments
without departing from the teachings of present inventive
concepts. The same reference numerals or the same refer-
ence designators denote the same or similar elements
throughout the specification.

As used herein, the terms "comprise", "comprising",
"comprises", "include", "including", "includes", "have",
"has", "having", or variants thereof are open-ended, and
include one or more stated features, integers, elements,
steps, components or functions but does not preclude the
presence or addition of one or more other features, integers,
elements, steps, components, functions or groups thereof.
Furthermore, as used herein, the common abbreviation
"e.g.", which derives from the Latin phrase "exempli gratia," may be used to introduce or specify a general example
or examples of a previously mentioned item, and is not
intended to be limiting of such item. The common abbre-
viation "i.e.", which derives from the Latin phrase "id est,"
may be used to specify a particular item from a more general
recitation.

Example embodiments are described herein with refer-
ence to block diagrams and/or flowchart illustrations of
computer-implemented methods, apparatus (systems and/or
devices) and/or computer program products. It is understood
that a block of the block diagrams and/or flowchart illus-
trations, and combinations of blocks in the block diagrams and/or flowchart illustrations, can be implemented by com-
puter program instructions that are performed by one or
more computer circuits. These computer program instruc-
tions may be provided to a processor circuit of a general
purpose computer circuit, special purpose computer circuit,
and/or other programmable data processing circuit to pro-
duce a machine, such that the instructions, which execute via
the processor of the computer and/or other programmable
data processing apparatus, transform and control transistors,
values stored in memory locations, and other hardware
components within such circuitry to implement the func-
tions/acts specified in the block diagrams and/or flowchart
block or blocks, and thereby create means (functionality)
and/or structure for implementing the functions/acts speci-
fied in the block diagrams and/or flowchart block(s).

These computer program instructions may also be stored
in a tangible computer-readable medium that can direct a
computer or other programmable data processing apparatus
to function in a particular manner, such that the instructions
stored in the computer-readable medium produce an article
of manufacture including instructions which implement the
functions/acts specified in the block diagrams and/or flow-
chart block or blocks. Accordingly, embodiments of present
inventive concepts may be embodied in hardware and/or in
software (including firmware, resident software, micro-
code, etc.) that runs on a processor such as a digital signal
processor, which may collectively be referred to as "cir-
cuitry," "a module" or variants thereof.

It should also be noted that in some alternate implemen-
tations, the functions/acts noted in the blocks may occur out
of the order noted in the flowcharts. For example, two blocks
shown in succession may in fact be executed substantially
concurrently or the blocks may sometimes be executed in
the reverse order, depending upon the functionality/acts
involved. Moreover, the functionality of a given block of the
flowcharts and/or block diagrams may be separated into
multiple blocks and/or the functionality of two or more
blocks of the flowcharts and/or block diagrams may be at
least partially integrated. Finally, other blocks may be
added/inserted between the blocks that are illustrated, and/or
blocks/operations may be omitted without departing from
the scope of inventive concepts. Moreover, although some of
the diagrams include arrows on communication paths to
show a primary direction of communication, it is to be
understood that communication may occur in the opposite
direction to the depicted arrows.

Many variations and modifications can be made to the
embodiments without substantially departing from the prin-
ciples of the present inventive concepts. All such variations
and modifications are intended to be included herein within
the scope of present inventive concepts. Accordingly, the
above disclosed subject matter is to be considered illustra-
tive, and not restrictive, and the examples of embodiments
are intended to cover all such modifications, enhancements,
and other embodiments, which fall within the spirit and
scope of present inventive concepts. Thus, to the maximum
extent allowed by law, the scope of present inventive con-
cepts are to be determined by the broadest permissible
interpretation of the present disclosure including the
examples of embodiments and their equivalents, and shall
not be restricted or limited by the foregoing detailed descrip-
tion.

Additional explanation is provided below.

Generally, all terms used herein are to be interpreted
according to their ordinary meaning in the relevant technical
field, unless a different meaning is clearly given and/or is
implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 11:
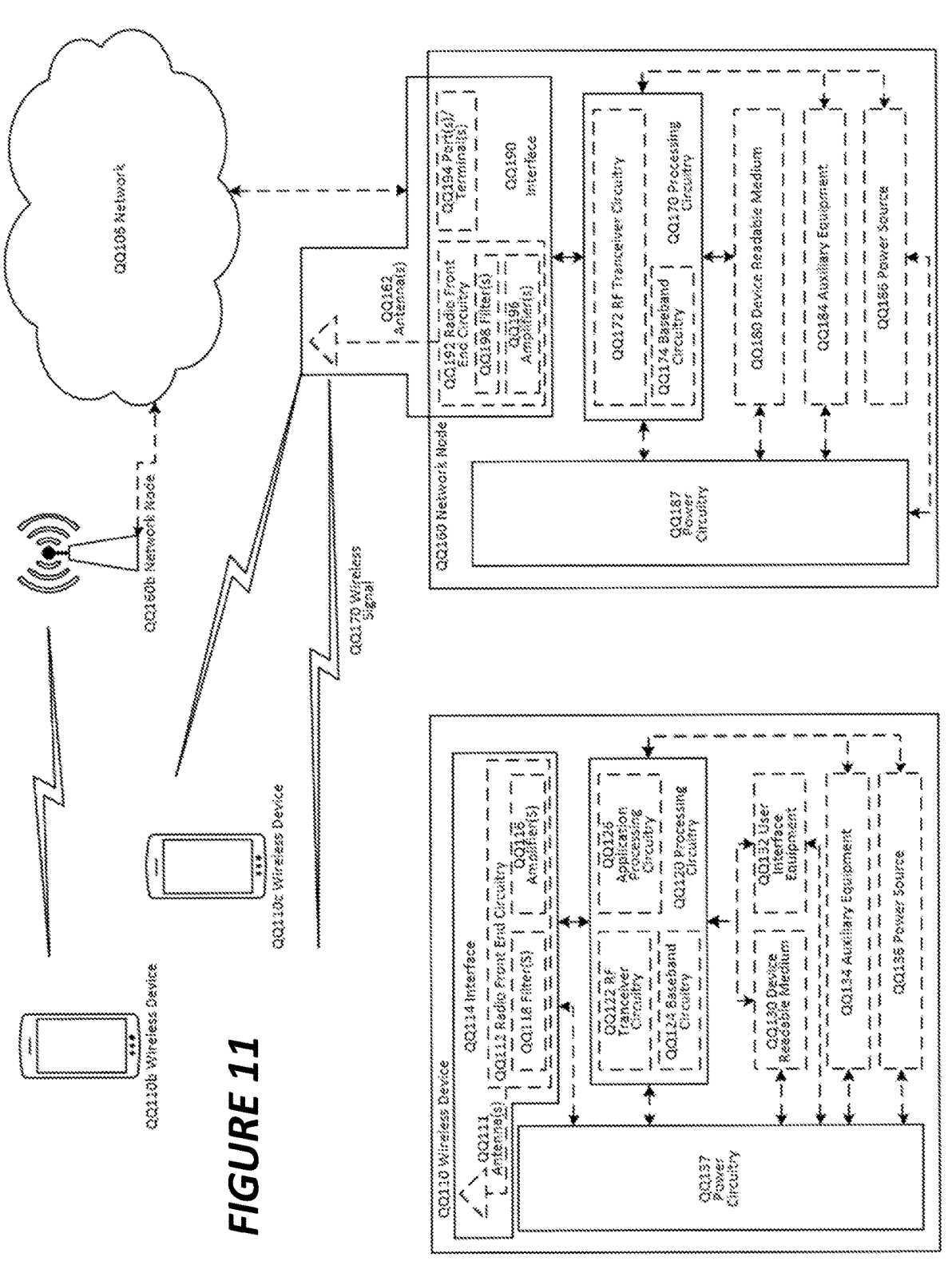
FIG. 11 is a block diagram of a wireless network in accordance with some embodiments.

FIG. 11: A Wireless Network in Accordance with Some Embodiments.

Although the subject matter described herein may be implemented in any appropriate type of system using any suitable components, the embodiments disclosed herein are described in relation to a wireless network, such as the example wireless network illustrated in FIG. 11. For simplicity, the wireless network of FIG. 11 only depicts network QQ106, network nodes QQ160 and QQ160b, and WDs QQ110, QQ110b, and QQ110c (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node QQ160 and wireless device (WD) QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and WD QQ110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 11, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 11 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units.

In certain embodiments, some or all of the functionality described herein as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner. In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190. In some embodiments, processing circuitry QQ170 and device readable medium QQ180 may be considered to be integrated.

Interface QQ190 is used in the wired or wireless communication of signalling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network node QQ160 may include additional components beyond those shown in FIG. 11 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner. In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry QQ120. In some embodiments, processing circuitry QQ120 and device readable medium QQ130 may be considered to be integrated. User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

Figure 12:
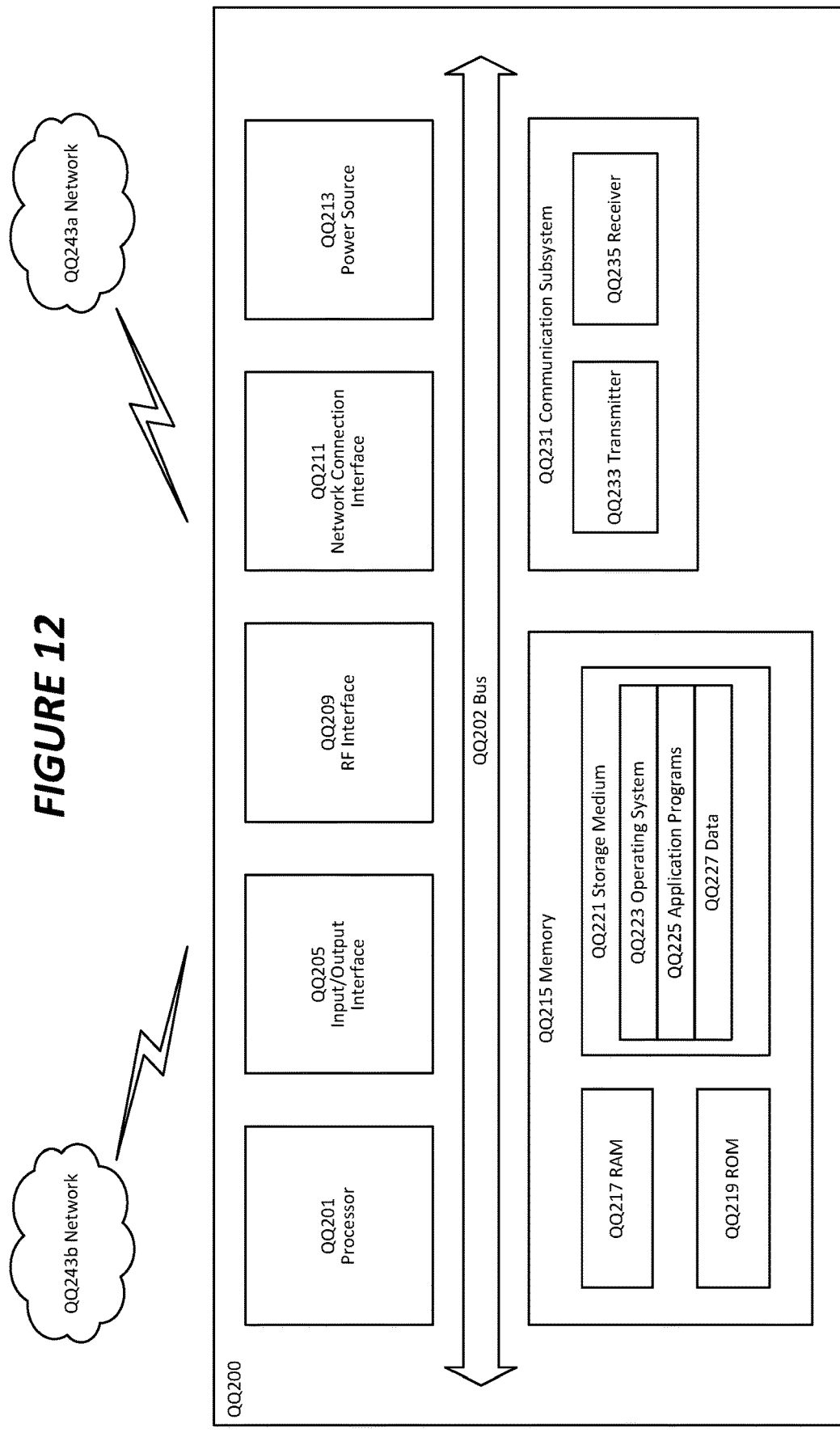
FIG. 12 is a block diagram of a user equipment in accordance with some embodiments

FIG. 12: User Equipment in Accordance with Some Embodiments

FIG. 12 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE QQ2200 may be any UE identified by the 3rd Generation Partnership Project (3GPP), including a NB-IoT UE, a machine type communication (MTC) UE, and/or an enhanced MTC (eMTC) UE. UE QQ200, as illustrated in FIG. 12, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 12 is a UE, the components discussed herein are equally applicable to a WD, and vice-versa.

In FIG. 12, UE QQ200 includes processing circuitry QQ201 that is operatively coupled to input/output interface QQ205, radio frequency (RF) interface QQ209, network connection interface QQ211, memory QQ215 including random access memory (RAM) QQ217, read-only memory (ROM) QQ219, and storage medium QQ221 or the like, communication subsystem QQ231, power source QQ233, and/or any other component, or any combination thereof. Storage medium QQ221 includes operating system QQ223, application program QQ225, and data QQ227. In other embodiments, storage medium QQ221 may include other similar types of information. Certain UEs may utilize all of the components shown in FIG. 12, or only a subset of the components. The level of integration between the components may vary from one UE to another UE. Further, certain UEs may contain multiple instances of a component, such as multiple processors, memories, transceivers, transmitters, receivers, etc.

In FIG. 12, processing circuitry QQ201 may be configured to process computer instructions and data. Processing circuitry QQ201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry QQ201 may include two central processing units (CPUs). Data may be information in a form suitable for use by a computer.

In the depicted embodiment, input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof. UE QQ200 may be configured to use an input device via input/output interface QQ205 to allow a user to capture information into UE QQ200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 12, RF interface QQ209 may be configured to provide a communication interface to RF components such as a transmitter, a receiver, and an antenna. Network connection interface QQ211 may be configured to provide a communication interface to network QQ243*a*. Network QQ243*a* may encompass wired and/or wireless networks such as a local-area network (LAN), a wide-area network (WAN), a computer network, a wireless network, a telecommunications network, another like network or any combination thereof. For example, network QQ243*a* may comprise a Wi-Fi network. Network connection interface QQ211 may be configured to include a receiver and a transmitter interface used to communicate with one or more other devices over a communication network according to one or more communication protocols, such as Ethernet, TCP/IP, SONET, ATM, or the like. Network connection interface QQ211 may implement receiver and transmitter functionality appropriate to the communication network links (e.g., optical, electrical, and the like). The transmitter and receiver functions may share circuit components, software or firmware, or alternatively may be implemented separately.

RAM QQ217 may be configured to interface via bus QQ202 to processing circuitry QQ201 to provide storage or caching of data or computer instructions during the execution of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), startup, or reception of keystrokes from a keyboard that are stored in a non-volatile memory. Storage medium QQ221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium QQ221 may be configured to include operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In FIG. 12, processing circuitry QQ201 may be configured to communicate with network QQ243*b* using communication subsystem QQ231. Network QQ243*a* and network QQ243*b* may be the same network or networks or different network or networks. Communication subsystem QQ231 may be configured to include one or more transceivers used to communicate with network QQ243*b*. For example, communication subsystem QQ231 may be configured to include one or more transceivers used to communicate with one or more remote transceivers of another device capable of wireless communication such as another WD, UE, or base station of a radio access network (RAN) according to one or more communication protocols, such as IEEE 802.QQ2, CDMA, WCDMA, GSM, LTE, UTRAN, WiMax, or the like. Each transceiver may include transmitter QQ233 and/or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

In the illustrated embodiment, the communication functions of communication subsystem QQ231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem QQ231 may include cellular communication, Wi-Fi communication, Bluetooth communication, and GPS communication. Network QQ243*b* may encompass wired and/or wireless networks such as a local-area network (LAN), a wide-area network (WAN), a computer network, a wireless network, a telecommunications network, another like network or any combination thereof. For example, network QQ243*b* may be a cellular network, a Wi-Fi network, and/or a near-field network. Power source QQ213 may be configured to provide alternating current (AC) or direct current (DC) power to components of UE QQ200.

The features, benefits and/or functions described herein may be implemented in one of the components of UE QQ200 or partitioned across multiple components of UE QQ200. Further, the features, benefits, and/or functions described herein may be implemented in any combination of hardware, software or firmware. In one example, communication subsystem QQ231 may be configured to include any of the components described herein. Further, processing circuitry QQ201 may be configured to communicate with any of such components over bus QQ202. In another example, any of such components may be represented by program instructions stored in memory that when executed by processing circuitry QQ201 perform the corresponding functions described herein. In another example, the functionality of any of such components may be partitioned between processing circuitry QQ201 and communication subsystem QQ231. In another example, the non-computationally intensive functions of any of such components may be implemented in software or firmware and the computationally intensive functions may be implemented in hardware.

Figure 13:
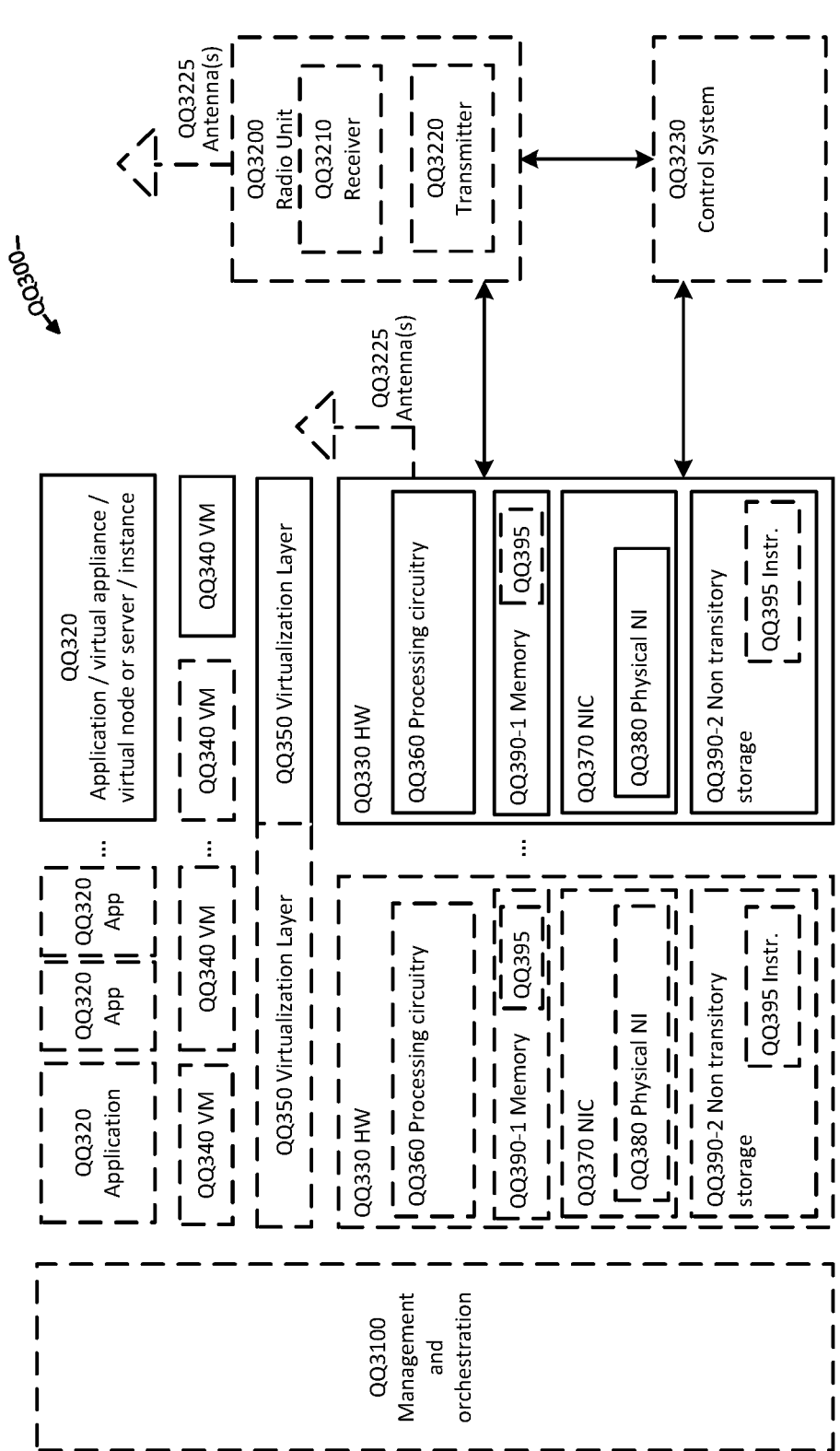
FIG. 13 is a block diagram of a virtualization environment in accordance with some embodiments.

FIG. 13: Virtualization Environment in Accordance with Some Embodiments

FIG. 13 is a schematic block diagram illustrating a virtualization environment QQ300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments QQ300 hosted by one or more of hardware nodes QQ330. Further, in embodiments in which the virtual node is not a radio access node or does not require radio connectivity (e.g., a core network node), then the network node may be entirely virtualized.

The functions may be implemented by one or more applications QQ320 (which may alternatively be called software instances, virtual appliances, network functions, virtual nodes, virtual network functions, etc.) operative to implement some of the features, functions, and/or benefits of some of the embodiments disclosed herein. Applications QQ320 are run in virtualization environment QQ300 which provides hardware QQ330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein.

Virtualization environment QQ300, comprises general-purpose or special-purpose network hardware devices QQ330 comprising a set of one or more processors or processing circuitry QQ360, which may be commercial off-the-shelf (COTS) processors, dedicated Application Specific Integrated Circuits (ASICs), or any other type of processing circuitry including digital or analog hardware components or special purpose processors. Each hardware device may comprise memory QQ390-1 which may be non-persistent memory for temporarily storing instructions QQ395 or software executed by processing circuitry QQ360. Each hardware device may comprise one or more network interface controllers (NICs) QQ370, also known as network interface cards, which include physical network interface QQ380. Each hardware device may also include non-transitory, persistent, machine-readable storage media QQ390-2 having stored therein software QQ395 and/or instructions executable by processing circuitry QQ360. Software QQ395 may include any type of software including software for instantiating one or more virtualization layers QQ350 (also referred to as hypervisors), software to execute virtual machines QQ340 as well as software allowing it to execute functions, features and/or benefits described in relation with some embodiments described herein.

Virtual machines QQ340, comprise virtual processing, virtual memory, virtual networking or interface and virtual storage, and may be run by a corresponding virtualization layer QQ350 or hypervisor. Different embodiments of the instance of virtual appliance QQ320 may be implemented on one or more of virtual machines QQ340, and the implementations may be made in different ways.

During operation, processing circuitry QQ360 executes software QQ395 to instantiate the hypervisor or virtualization layer QQ350, which may sometimes be referred to as a virtual machine monitor (VMM). Virtualization layer QQ350 may present a virtual operating platform that appears like networking hardware to virtual machine QQ340.

As shown in FIG. 13, hardware QQ330 may be a standalone network node with generic or specific components. Hardware QQ330 may comprise antenna QQ3225 and may implement some functions via virtualization. Alternatively, hardware QQ330 may be part of a larger cluster of hardware (e.g. such as in a data center or customer premise equipment (CPE)) where many hardware nodes work together and are managed via management and orchestration (MANO) QQ3100, which, among others, oversees lifecycle management of applications QQ320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine QQ340 may be a software implementation of a physical machine that runs programs as if they were executing on a physical, non-virtualized machine. Each of virtual machines QQ340, and that part of hardware QQ330 that executes that virtual machine, be it hardware dedicated to that virtual machine and/or hardware shared by that virtual machine with others of the virtual machines QQ340, forms a separate virtual network elements (VNE).

Still in the context of NFV, Virtual Network Function (VNF) is responsible for handling specific network functions that run in one or more virtual machines QQ340 on top of hardware networking infrastructure QQ330 and corresponds to application QQ320 in FIG. 13.

In some embodiments, one or more radio units QQ3200 that each include one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as a radio access node or a base station.

In some embodiments, some signalling can be effected with the use of control system QQ3230 which may alternatively be used for communication between the hardware nodes QQ330 and radio units QQ3200.

Figure 14:
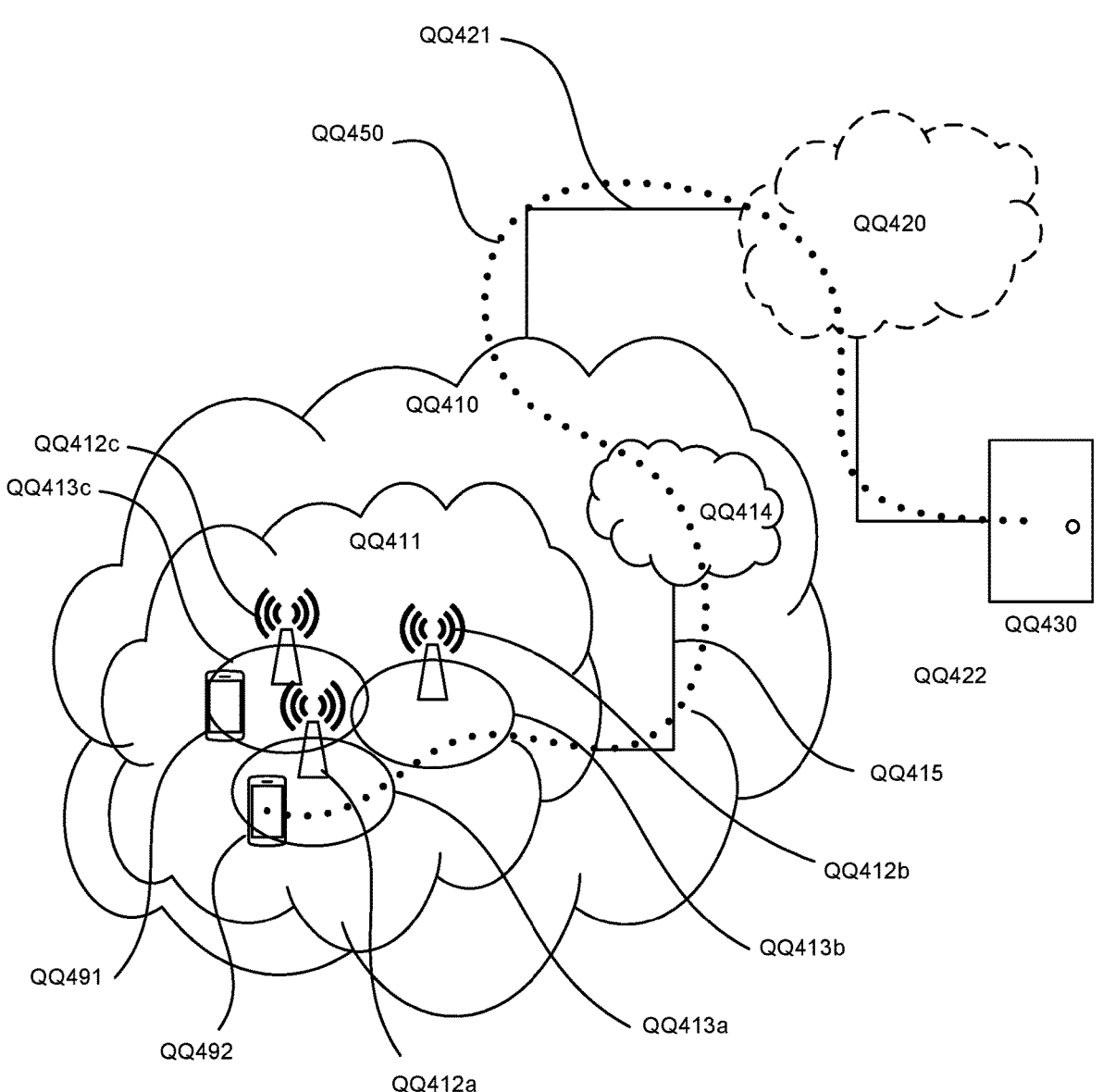
FIG. 14 is a block diagram of a telecommunication network connected via an intermediate network to a host computer in accordance with some embodiments.

FIG. 14: Telecommunication network connected via an intermediate network to a host computer in accordance with some embodiments.

With reference to FIG. 14, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 14 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Figure 15:
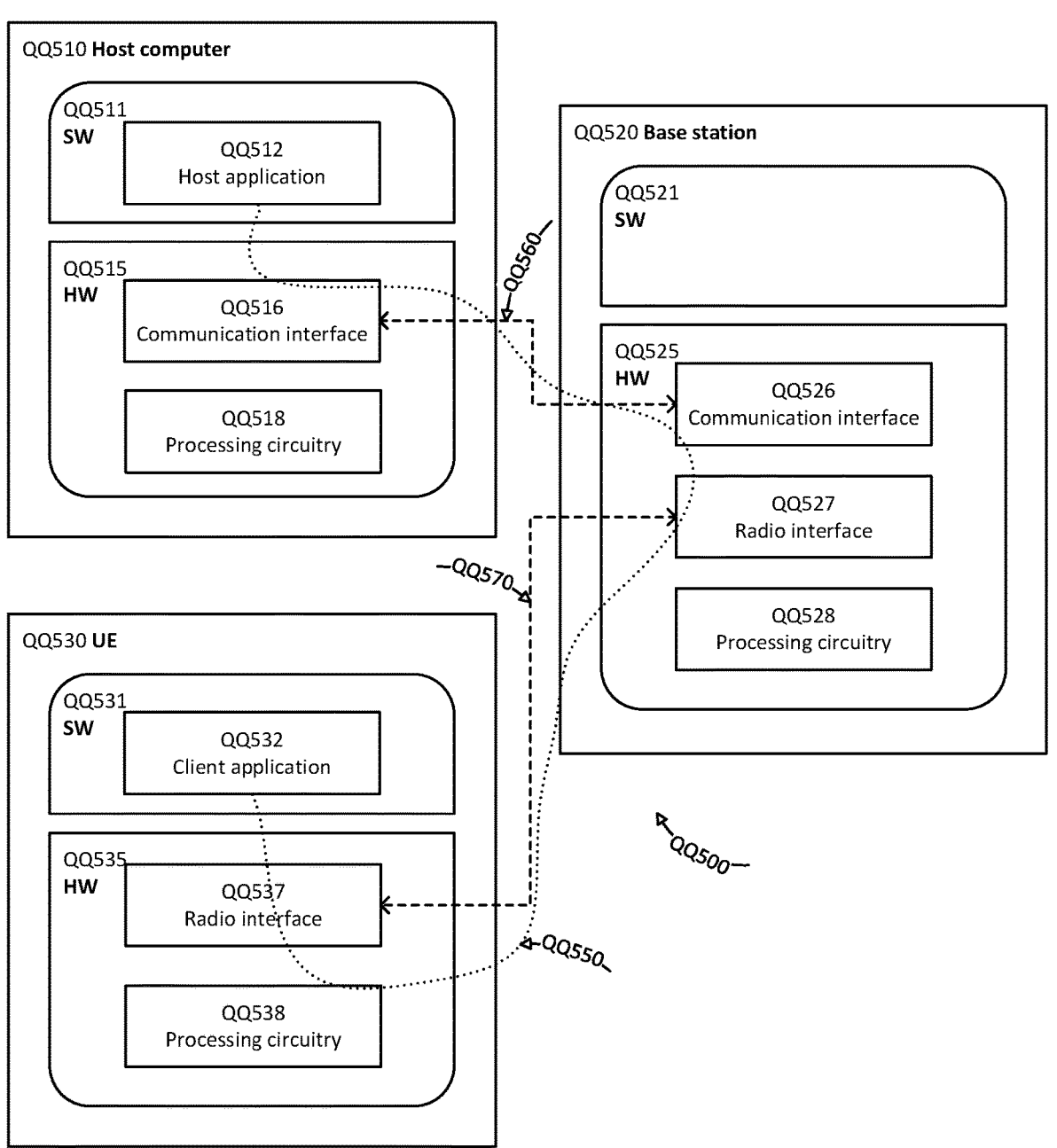
FIG. 15 is a block diagram of a host computer communicating via a base station with a user equipment over a partially wireless connection in accordance with some embodiments.

FIG. 15: Host Computer Communicating Via a Base Station with a User Equipment Over a Partially Wireless Connection in Accordance with Some Embodiments.

Example implementations, in accordance with an embodiment, of the UE, base station and host computer discussed in the preceding paragraphs will now be described with reference to FIG. 15. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 15) served by base station QQ520. Communication interface QQ526 may be configured to facilitate connection QQ560 to host computer QQ510. Connection QQ560 may be direct or it may pass through a core network (not shown in FIG. 15) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. Its hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

It is noted that host computer QQ510, base station QQ520 and UE QQ530 illustrated in FIG. 15 may be similar or identical to host computer QQ430, one of base stations QQ412a, QQ412b, QQ412c and one of UEs QQ491, QQ492 of FIG. 14, respectively. This is to say, the inner workings of these entities may be as shown in FIG. 15 and independently, the surrounding network topology may be that of FIG. 14.

In FIG. 15, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments may improve the performance of OTT services provided to UE QQ530 using OTT connection QQ550, in which wireless connection QQ570 forms the last segment. More precisely, the teachings of these embodiments may improve the deblock filtering for video processing and thereby provide benefits such as improved video encoding and/or decoding.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figure 16:
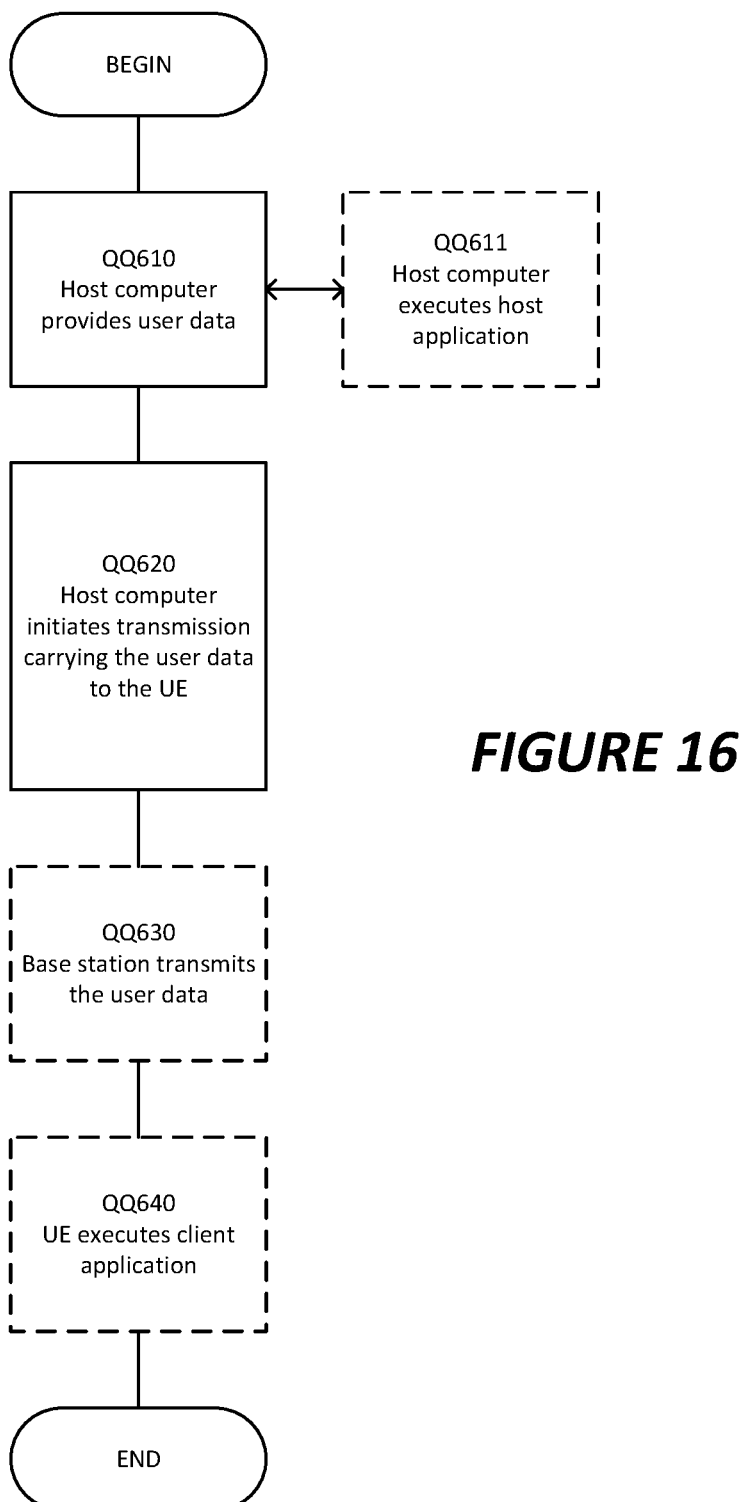
FIG. 16 is a block diagram of methods implemented in a communication system including a host computer, a base station, and a user equipment in accordance with some embodiments.

FIG. 16: Methods Implemented in a Communication System Including a Host Computer, a Base Station and a User Equipment in Accordance with Some Embodiments.

FIG. 16 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 16 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

Figure 17:
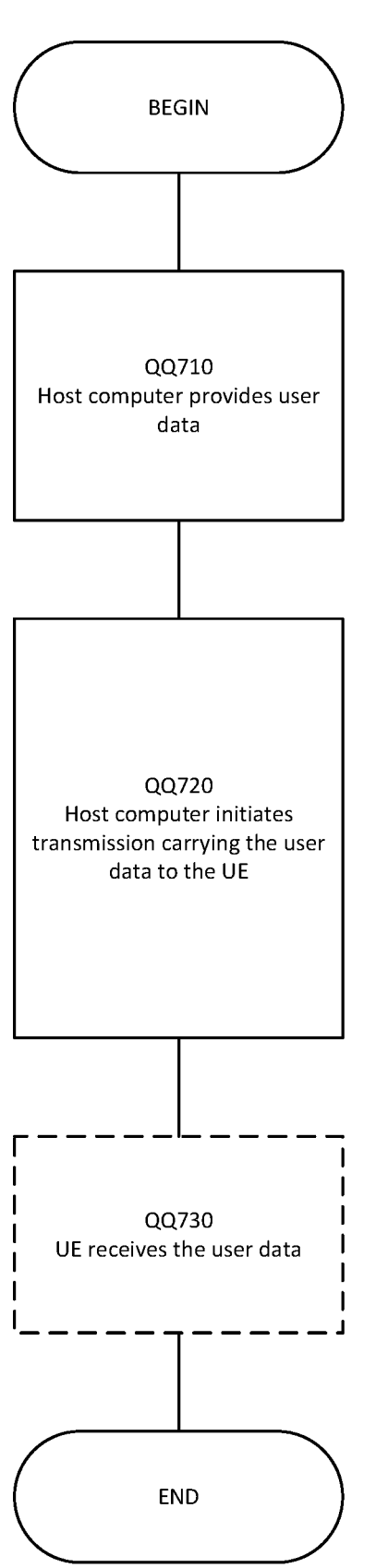
FIG. 17 is a block diagram of methods implemented in a communication system including a host computer, a base station, and a user equipment in accordance with some embodiments.

FIG. 17: Methods Implemented in a Communication System Including a Host Computer, a Base Station and a User Equipment in Accordance with Some Embodiments.

FIG. 17 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 17 will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

Figure 18:
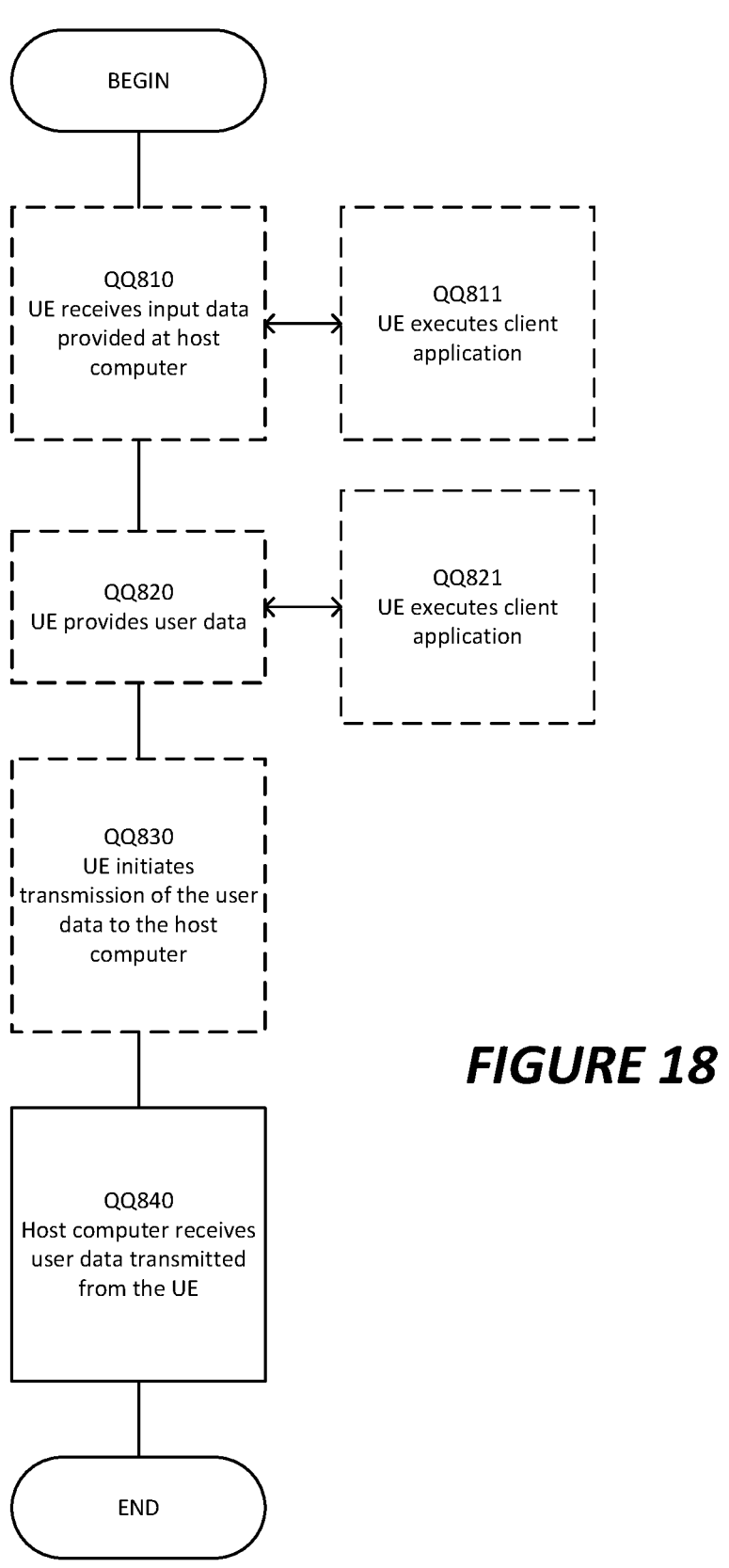
FIG. 18 is a block diagram of methods implemented in a communication system including a host computer, a base station, and a user equipment in accordance with some embodiments.

FIG. 18: Methods Implemented in a Communication System Including a Host Computer, a Base Station and a User Equipment in Accordance with Some Embodiments.

FIG. 18 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 18 will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

Figure 19:
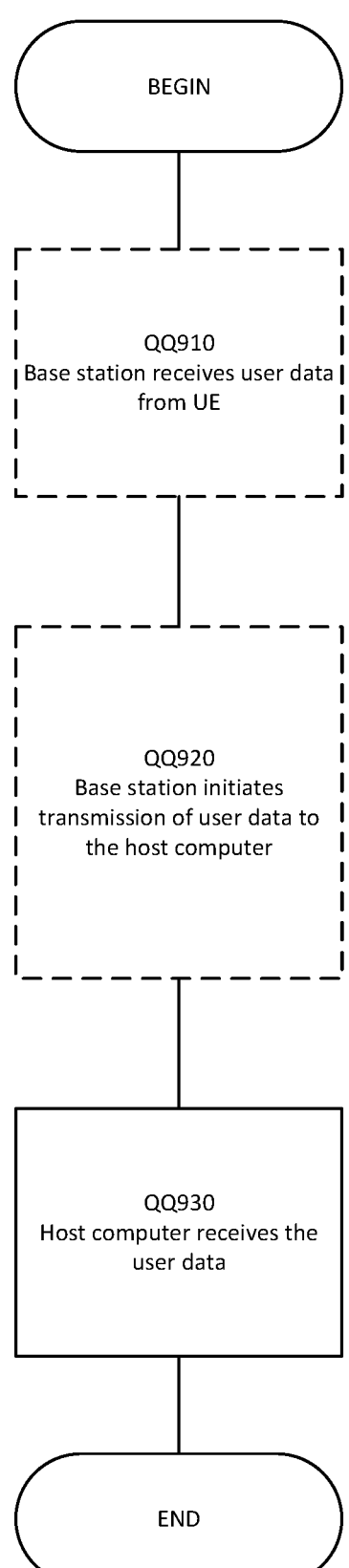
FIG. 19 is a block diagram of methods implemented in a communication system including a host computer, a base station, and a user equipment in accordance with some embodiments.

FIG. 19: Methods Implemented in a Communication System Including a Host Computer, a Base Station and a User Equipment in Accordance with Some Embodiments.

FIG. 19 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 19 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930

(which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

The invention claimed is:

1. A method of operating a radio network node in a wireless communication system, comprising:
  adaptively limiting effective isotropically radiated power of downlink signals transmitted by the radio network node on different physical channels; and
  updating a power control offset of a user equipment based on the adaptively limited EIRP of the downlink signals.

2. The method of claim 1, wherein adaptively limiting the EIRP of downlink signals comprises limiting the EIRP of downlink signals on different physical channels based on transmission gains associated with the different physical channels.

3. The method of claim 2, further comprising:
  estimating the transmission gain associated with a first downlink channel; and
  calculating an EIRP level for the first downlink channel based on the estimated transmission gain of the first channel.

4. The method of claim 3, wherein the estimated transmission gain of the first channel is based on a number of multiple input multiple output layers transmitted on the first channel.

5. The method of claim 4, wherein the estimated transmission gain of the first channel is based on one or more of a precoding gain ($G_{precoding}$), a port-to-antenna mapping gain ($G_{p2a}$), a beamforming gain ($G_{subarrayAndElement}$), a tuning gain ($G_{tuning}$), and a boost gain ($G_{boost}$).

6. The method of claim 5, further comprising:
  estimating a direction angle toward a wireless device associated with the first downlink channel,
  wherein the beamforming gain $G_{subarrayAndElement}$ and the port-to-antenna mapping gain $G_{p2a}$ are based on the direction angle.

7. The method of claim 4, wherein the first channel comprises a physical downlink shared channel associated with a wireless device, and wherein the estimated transmission gain of the first channel ($G_{pdsch}$) is calculated as:

$$G_{pdsch}=G_{precoding}+G_{p2a}+G_{subarrayAndElement}+G_{tuning}+G_{layersplit}+G_{boost}$$

where $G_{layersplit}$ represents a gain associated with a number of MIMO layers transmitted on the first channel.

8. The method of claim 7, wherein the EIRP level for the first channel is calculated as:

$$EIRP_{pdsch}=G_{pdsch}+TXPower$$

where TXPower represents the transmission power on the first channel.

9. The method of claim 8, further comprising calculating an EIRP backoff as:

$$pdschEirpBackoff=max(0, EIRP_{pdsch}-maxEirpTh)$$

where maxEirpTh is a maximum EIRP threshold.

10. The method of claim 9, further comprising adjusting a power of a signal transmitted on the first channel based on the EIRP backoff.

11. The method of claim 4, wherein the EIRP level for the first channel is calculated as a sum of the transmission gain and the transmission power of the first channel.

12. The method of claim 3, further comprising:
  determining if multiuser-MIMO is being used; and
  in response to determining that multi-user MIMO is being used, calculating the transmission gain of the first channel based in part on a multiuser MIMO gain ($G_{mu}$).

13. The method of claim 3, wherein the first channel comprises a single user MIMO channel, wherein the estimated transmission gain of the first channel ($G_{pdsch}$) is based on a reciprocity precoder gain ($G_{rat}$) that represents both a precoder gain and a port-to-antenna mapping gain.

14. The method of claim 3, wherein the first downlink channel comprises a physical downlink shared channel (PDSCH), a physical downlink control channel (PDCCH), a synchronization signal block (SSB), a channel state information reference signal (CSI-RS), a demodulation reference signal (DMRS), or a tracking reference signal (TRS).

15. The method of claim 1, wherein adaptively limiting the EIRP of downlink signals comprises limiting the EIRP of downlink signals on different physical channels based on a number of multiple input multiple output layers transmitted on the different physical channels.

16. The method of claim 1, wherein adaptively limiting the EIRP of downlink signals comprises establishing a single EIRP density limit for all downlink channels, wherein EIRP density comprises an EIRP per unit of downlink bandwidth.

17. The method of claim 1, wherein adaptively limiting the EIRP of downlink signals comprises establishing a single EIRP limit for all downlink channels.

18. The method of claim 17, wherein the EIRP limit is generated based on an EIRP density limit and a downlink bandwidth of the downlink signals.

19. The method of claim 18, wherein the EIRP limit is calculated as $$EIRP\_limit=eirpDensity+10log10(BW_{DL})$$

where eirpDensity is the EIRP density limit and $BW_{DL}$ is the downlink bandwidth for downlink signals.

20. The method of claim 1, wherein adaptively limiting the EIRP of downlink signals comprises establishing separate EIRP limits for different downlink channels.

21. The method of claim 1, wherein adaptively limiting the EIRP of downlink signals comprises establishing separate EIRP density limits for different downlink channels, wherein EIRP density comprises an EIRP per unit of downlink bandwidth.

22. The method of claim 1, wherein adaptively limiting the EIRP of downlink signals comprises establishing separate power backoff levels for different downlink channels.

23. The method of claim 1, further comprising:

performing link adaptation of at least one downlink channel based on the adaptively limited EIRP of the downlink signals.

24. A radio network node, comprising:

a processing circuit;

a transceiver coupled to the processing circuit; and a memory coupled to the processing circuit, wherein the memory comprises computer readable program instructions that, when executed by the processing circuit, cause the radio network node to:

adaptively limit effective isotropically radiated power (EIRP) of downlink signals transmitted through the transceiver on different physical channels; and update a power control offset of a user equipment based on the adaptively limited EIRP of the downlink signals.

\* \* \* \* \*